United States Patent [19]

Terashita

[11] Patent Number: 4,974,017
[45] Date of Patent: Nov. 27, 1990

[54] METHOD OF DETERMINING EXPOSURE

[75] Inventor: Takaaki Terashita, Kanagawa, Japan

[73] Assignee: Fuji Photo Film Co., Ltd., Kanagawa, Japan

[21] Appl. No.: 406,209

[22] Filed: Sep. 12, 1989

[30] Foreign Application Priority Data

Sep. 27, 1988 [JP] Japan ................. 63-241390
Sep. 27, 1988 [JP] Japan ................. 63-241391
Sep. 29, 1988 [JP] Japan ................. 63-245812

[51] Int. Cl.$^5$ ............................................. G03B 27/80
[52] U.S. Cl. ........................................ 355/38; 355/68; 355/77
[58] Field of Search ........................... 355/38, 68, 77; 356/444

[56] References Cited

U.S. PATENT DOCUMENTS

| | | | |
|---|---|---|---|
| 4,101,216 | 7/1978 | Grossmann | 355/38 X |
| 4,101,217 | 7/1978 | Fergg et al. | 355/38 |
| 4,203,671 | 5/1980 | Takahashi et al. | 355/38 X |
| 4,406,538 | 9/1983 | Bühler | 355/38 X |
| 4,492,458 | 1/1985 | Bickl et al. | 355/38 |
| 4,561,768 | 12/1985 | Fürsich et al. | 355/38 |
| 4,589,766 | 5/1986 | Füsich et al. | 355/38 |
| 4,641,959 | 2/1987 | Terashita | 355/38 X |

FOREIGN PATENT DOCUMENTS 4929641 3/1974 Japan .
531230 1/1978 Japan .

Primary Examiner—L. T. Hix
Assistant Examiner—D. Rutledge
Attorney, Agent, or Firm—Sughrue, Mion, Zinn, Macpeak & Seas

[57] ABSTRACT

An exposure determining method. Light is measured with respect to a plurality of portions of film images into which images on films to be subjected to printing are divided, thereby obtaining photometric data. The printing exposure condition for a reference film type is corrected with respect to at least one color selected on the basis of the difference in the three color balance of one of the films to be subjected to printing, from that of the reference film type. The exposure is determined on the basis of the corrected printing exposure condition and on the basis of image densities with respect to three colors which are calculated on the basis of photometric data belonging to a specific color region. In one form of the method, items of photometric data are classified by determining to which color regions these items of data belong, certain color regions are selected in accordance with the numbers of items of the photometric data, and the exposure is determined using those photometric data belonging the selected color regions. This makes it possible to determine the correct exposure of an original image formed by photography using a light source different from daylight.

22 Claims, 19 Drawing Sheets

F I G. 5 (1)
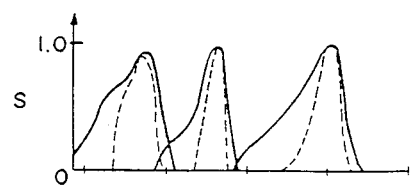
F I G. 5 (2)
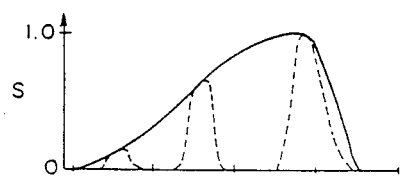
F I G. 5 (3)
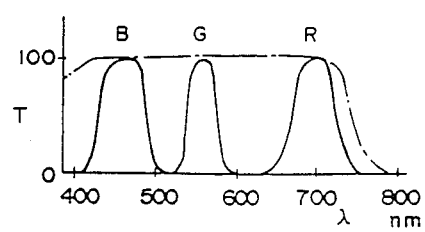

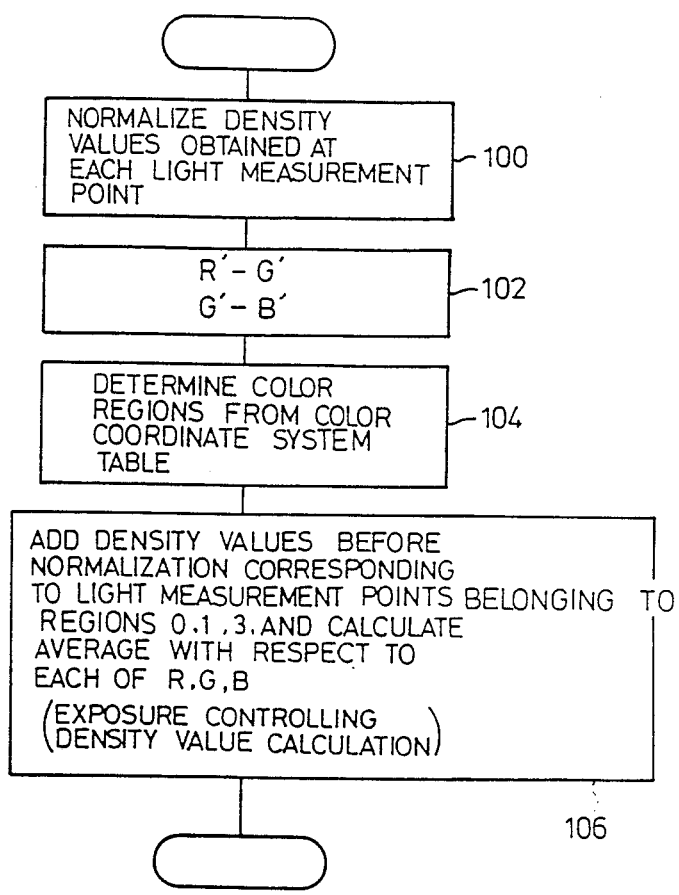
F I G. 10

FIG.11

|   |   |   |   |   |   |   | G'-B' |   |   |   |   |
|---|---|---|---|---|---|---|---|---|---|---|---|
| 4 | 4 | 4 | 4 | 4 | 4 | 4 | 4 | 4 | 4 | 2 | 2 |
| 4 | 4 | 4 | 4 | 4 | 4 | 4 | 4 | 3 | 3 | 2 | 2 |
| 4 | 4 | 4 | 4 | 4 | 1 | 1 | 1 | 3 | 3 | 3 | 2 |
| 4 | 4 | 4 | 4 | 1 | 1 | 1 | 1 | 3 | 3 | 3 | 2 |
| 5 | 4 | 4 | 1 | 1 | 1 | 1 | 1 | 3 | 3 | 3 | 2 |
| 5 | 5 | 4 | 1 | 1 | 1 | 0 | 0 | 1 | 3 | 3 | 2 | 2 |
| 5 | 5 | 5 | 1 | 1 | 0 | 0 | 0 | 0 | 1 | 1 | 2 | 2 |
| 5 | 5 | 5 | 1 | 1 | 0 | 0 | 0 | 0 | 1 | 1 | 2 | 2 |
| 5 | 5 | 5 | 1 | 1 | 1 | 0 | 0 | 1 | 7 | 7 | 7 |
| 5 | 5 | 5 | 5 | 1 | 1 | 1 | 1 | 1 | 1 | 7 | 7 | 7 |
| 5 | 5 | 5 | 6 | 6 | 1 | 1 | 1 | 1 | 1 | 7 | 7 | 7 |
| 5 | 5 | 6 | 6 | 6 | 6 | 6 | 6 | 6 | 7 | 7 | 7 |
| 5 | 6 | 6 | 6 | 6 | 6 | 6 | 6 | 6 | 6 | 7 | 7 |
| 6 | 6 | 6 | 6 | 6 | 6 | 6 | 6 | 6 | 6 | 7 | 7 |

R'-G'

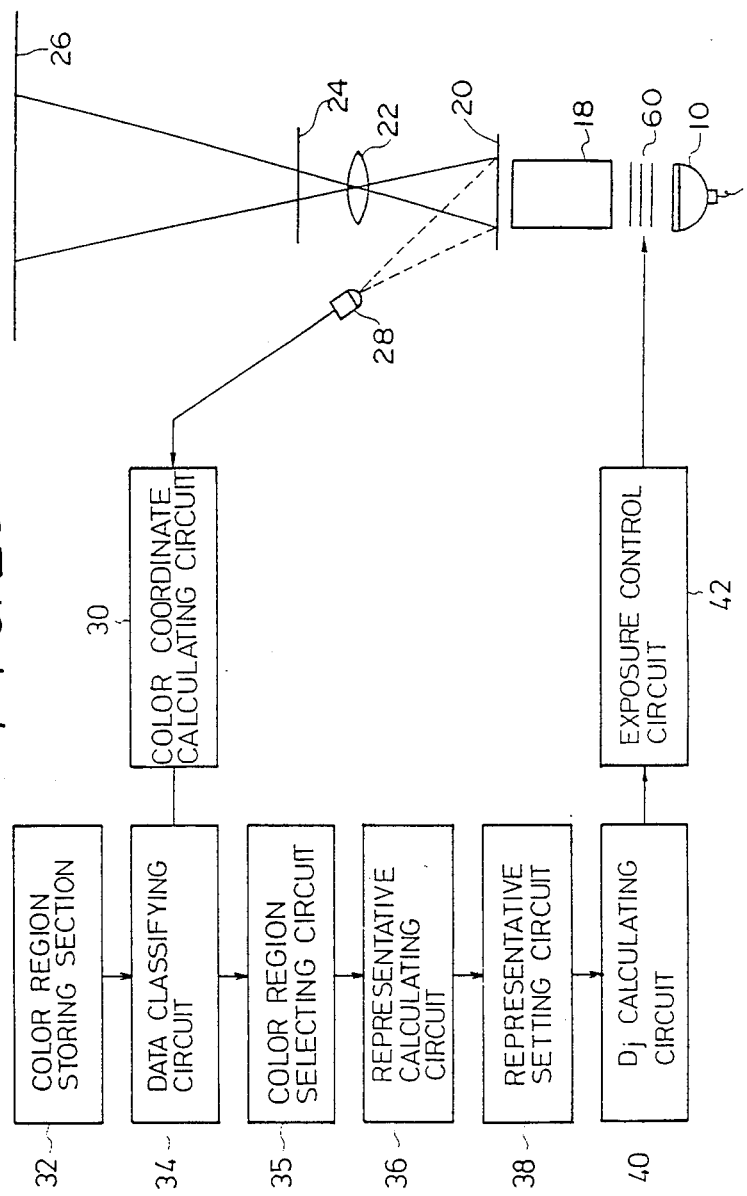

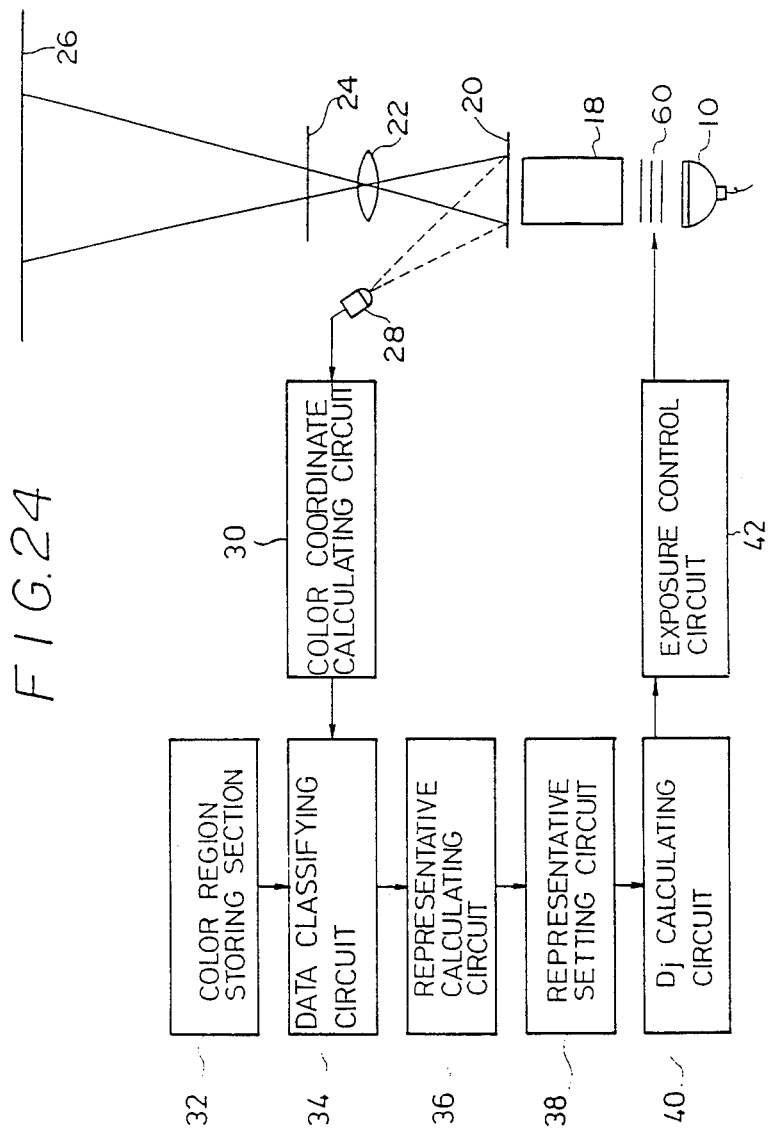

F I G. 25
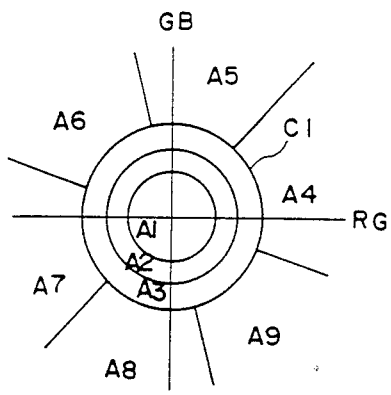

METHOD OF DETERMINING EXPOSURE

BACKGROUND OF THE INVENTION

1. Field of the Invention

The present invention relates to an exposure determining method. In particular, the present invention relates to a method of determining a photographic printing exposure that is capable of automatically determining, on the basis of the printing exposure condition for a reference film type, the correct printing exposure condition for those film types whose characteristics are different from those of the reference film type; and also relates to an exposure determining method applicable to image copying equipment to determine the exposure effected by the image copying equipment such as an automatic photographic printer (automatic printer) for printing images on color photographs, such as color films, onto color paper.

2. Description of the Related Art

An image formed on a color negative allows, on the whole, the transmission therethrough of light of three colors, i.e., blue (B) light, green (G) light, and red (R) light. It is known from experience that, as a rule, the transmittance of these three color-components are substantially equal to one another, or to one fixed ratio. From this fact, an automatic printer determines a printing light quantity (exposure) on the basis of the following formula:

$$\text{Log } Fj = Kj + Dj \quad \ldots (1)$$

where log F represents the logarithm of the printing light quantity, K represents a constant, D represents the large area transmission density (LATD) of the negative which is measured by a photometric system, and j stands for any of B light, G light, and R light.

However, when the printing light quantity is controlled by an automatic printer on the basis of the above stated formula (1), the following problem arises. If a negative used in the photography of a gray object is underexposed, a print produced from this negative has an overall high density as compared with a print produced from a normally exposed negative. On the other hand, if the negative is overexposed, a print produced from this negative has a low density. In order to cope with this problem, a slope control circuit is provided to correct the term Dj in the formula (1) before the exposure is finally determined. However, even with an automatic printer provided with this slope control circuit, defective prints having an incorrect color balance may be produced when the negative used is, for instance, a negative whose properties have changed due to the passage of a long period, a negative subjected to photography using a light source much different from daylight, such as a fluorescent lamp or a tungsten lamp (i.e., a heterogeneous light-source negative), or a negative suffering from color failure. In order to cope with this problem, the term Dj of the formula (1) is corrected during the determination of the exposure. This procedure is called color correction, and there are three manners of color correction, i.e., normal correction, high correction having a higher degree of correction than the normal correction, and lowered correction having a lower degree than the same.

In recent years, many types of high-sensitivity films have been developed, and the number of film types available has increased to several tens. However, the printing exposure conditions required by a plurality of film types are not always the same. In addition, although condition setting films are used to set the condition of the automatic printer with respect to each of various different film types, they cover only a very limited number of film types, which may serve as reference film types. Normally, a condition setting film is a negative having a first portion corresponding to a negative on which an image of a gray object is formed by photographing, and a second portion disposed around the first portion and corresponding to a negative on which an image of an object of a yellow green color close to gray is formed by photographing. Three kinds of condition setting films, i.e., a correct exposure negative, an underexposed negative, and an overexposed negative are available with respect to one reference film type. However, with respect to those film types which have no corresponding condition setting films available, the setting of the respective printing exposure conditions is very difficult and requires a long time with an experienced operator. Further, in order to maintain high print quality, it is essential to suitably manage the printing exposure conditions with respect to each of various different film types. However, this management is difficult when there are many film types. To cope with this problem, certain techniques have been proposed to automatically determine, on the basis of a single reference condition for printing exposure, the correct exposure to be used during printing with respect to each of various different film types.

With respect to films whose properties have changed due to the passage of time or films having various different characteristics (i.e., films having characteristic curves of different configurations), it is known that, if these films are subjected to printing while the exposure is controlled using high correction, correct prints can be produced relatively easily. The resultant print quality, however, is not sufficiently high.

A technique known from Japanese Patent Laid-Open Nos. 1-94927 (1976), 52-20024 (1977), 59-220761 (1984), 61-198144 (1986), etc. is to divide film images into a plurality of portions, measure light with respect to each of the portions, analyze items of data (photometric data) obtained by the mesurement of light, and correct a reference printing exposure condition using selected items of the photometric data so as to determine the exposure condition for use in printing of a film image which is to be printed. According to this known art, if the spectral sensitivity distribution in the light-measuring portion of the photometric system of the automatic printer accords with that of a printing photosensitive material with a very high degree of precision, it is possible to subject a plurality of types of films having different characteristics, to printing on the basis of the printing exposure condition corresponding to a reference film type.

If such is the case, i.e., if the spectral sensitivity distribution of the photometric system accords with that of the exposure portion, it is possible to effect correct printing exposure with respect to each of several film types on the basis of the printing exposure condition for the reference film type, only within the linear portions of the characteristic curves of the relevant film with respect to R, G and B lights. For this reason, the above described known art fails to produce good printed images within the exposure region that corresponds to the non-linear portions of the characteristic curves. Concerning the non-linear portions of the characteristic curves, Japanese Patent Laid-Open No. 49-29641 (1974) proposes an electrical circuit for correcting a non-linear portion at the upper or lower end of a characteristic curve into straight lines approximating the curve. With this art, however, since the non-linear portion of a characteristic curve is corrected into straight lines, it still fails to produce good printed images within the exposure region corresponding to the non linear portions of the characteristic curves.

The reasons why it is impossible to produce good printed images within the exposure region corresponding to the non-linear portions of the characteristic curves of a film will be described in detail with reference to FIG. 14. It is assumed that a reference film type has characteristic curves with respect to three colors, which are substantially identical with those characteristic curves with respect to G and R shown in FIG. 14, while a film to be subjected to printing has characteristic curves which are substantially identical with the characteristic curves with respect to R, G and B shown in FIG. 14. In this case, since the characteristic curves of the reference film type are such that the gradient of the curve portions in the overexposure range is smaller than that of the linear portions, a relatively small slope control value is set within the overexposure range. However, if the relevant film is subjected to printing using the set slope control value, the set slope control value is too small for the characteristic curve of the film with respect to B, thereby resulting in a shortage of the exposure of the blue sensitive layer of printing paper. As a result, the yellow pigment fails to emit color appropriately, and the resultant print tends to be bluish on the whole. In this way, in the above described case, it is impossible to produce good printed imaqes.

A problem similar to that described above concerning the overexposure range arises also with respect to the underexposure range. Specifically, in the above described case, since those portions of the characteristics curves of the relevant film corresponding to the underexposure range deviate from those of the reference film type, this also leads to the problem that good printed images cannot be produced.

As described above, when the characteristics with respect to R, G and B of a film to be subjected to printing are such that the balance in density between the three colors R, G and B differs from the balance in density between the three colors possessed by the reference film type used, there is the risk that, on the resultant print, the complementary color of the color causing the inter-film difference in the three color density balance may be emitted only to an excessive or insufficient extent. Thus, the difference in the three color density balance of a film to be subjected to printing from that of the reference film type used makes it impossible to produce good printed images.

Other differences in characteristics between a film to be subjected to printing and the reference film type used makes it difficult to produce good printed images. Certain films, such as a film whose characteristic curves have a steeper gradient than that of the reference film type used, or a film whose mask density (i.e., base density) is higher than that of the reference film type used, possess higher densities than the reference film type even in the overexposure range. Accordingly, the corresponding exposure time is long, and this makes the density achievable on print paper, highly vulnerable to influence by the failure of the reciprocity law. In the case of the reference film type, the determination of the exposure condition normally employs a slope controlling function in the overexposure range, thereby compensating for the possible influence by the failure of the reciprocity law. However, when the film to be subjected to printing possesses a higher density than the reference film type in the overexposure range, it is impossible for a slope controlling function to appropriately compensate for influence by the failure of the reciprocity law on print paper. In this way, when a film whose characteristic with respect to a certain color corresponds to a higher density than the reference film type in the overexposure range, a print produced from the film suffers from an insufficient print density with respect to that color, and fails to provide a good printed image.

Various difficulties are met with in determining the printing exposure condition for negatives of certain kinds. As described above, defective prints having an incorrect color balance may be produced by an automatic printer provided with the above-described slope control circuit, when the negative used is, for instance, a negative whose properties have changed due to the passage of a long period of time, a negative subjected to photography using a light source much different from daylight, such as a fluorescent lamp or a tungsten lamp (i.e., a heterogeneous light-source negative), or a negative suffering from color failure. In addition, when it is necessary to process heterogeneous films, i.e., films manufactured by different manufacturers, or films having differing sensitivities, because the three photo-sensitive layers of such heterogeneous films have different sensitivities, densities, etc., it is impossible to produce good prints under the same printing condition. In practice, therefore, various printing exposure conditions are determined with respect to various different film types by trial and error. They are then stored in a memory, and the printing condition corresponding to the film type to be subjected to printing is selected to produce prints. During the determination of the exposure, the term Dj of the formula (1) is corrected, thereby effecting color correction. If heterogeneous films are to be processed, another procedure takes place where the slope control circuit value is varied.

Methods of a certain type have hitherto been known as an improvement of the above described techniques for determining the exposure. In the methods photometric data is obtained by measuring light with respect to a plurality of portions into which original images on color photographs are divided, and the resultant photometric data is evaluated. These methods fall into two categories in accordance with the manner in which the photometric data is evaluated. Methods in the first category compare items of photometric data with a reference value, and determine the printing exposure solely on the basis of those items of photometric data selected on the basis of the result of this comparison. Methods in the second category determine the printing exposure by taking all the photometric data into consideration.

Examples of methods in the first category are disclosed in Japanese Patent Publication Nos. 56-15492 (1981) and 59-29847 (1984), and Japanese Patent Laid-Open Nos. 52156624 (1977), 53-1230 (1978), 58-118636 (1983), 59-220760 (1984), and 59-220761 (1984). In the art known from these proposals, those items of photometric data which have not been selected are not included in the determination of the exposure.

Consequently, the exposure is determined only on the basis of a small number of items of photometric data when only a small number of items of photometric data are selected from among all the items of data obtained concerning the images to be processed because, for instance, the images to be processed have colors greatly deviating from certain standards. In such cases, the precision with which the exposure is determined cannot always be high, thereby leading to a risk of the resultant print suffering from problems with colors. With a method in the first category, the number of items of photometric data selected can be small due to deviation in colors when the film used has been subjected to photography using a heterogeneous light source such as a fluorescent lamp or a tungsten lamp, or when it has been subjected to photography in the sunlight but at a low color temperature, e.g., in the evening sunlight or winter sunlight. In such cases, the resultant print tends to have colors with emphasis on the color of the light source used during photography. Thus, a method in the first category inevitably leads to a degradation of print quality when the negative used is a heterogeneous light-source negative or the like. Further, with the method, when the images to be processed have greatly deviated colors, there is the risk that all the items of photometric data may be excluded by the selection procedure. If such is the case, the mean values of the averages of the B, G and R densities of the images which are calculated with respect to three colors are often used. With this method, however, since information on the actual colors of the photographic image is lost, it is impossible to produce prints with good colors.

Still further, when the images to be processed have greatly deviated colors, if all the items of photometric data are excluded by the selection procedure, and the three-color mean values of the averages of the B, G and R densities of the images are used, since these values do not represent the characteristics of the photographic images, only a low level of correction is possible when the images to be processed are formed on films of various different types.

An example of a method in the second category is disclosed in Japanese Patent Laid-Open No. 61-198144 (1986). In this method, items of the photometric data are sorted out by determining whether each item of data belongs to a high-saturation region or a low-saturation region, and the exposure is calculated on the basis of the above-stated formula (1) in which is employed the weighted mean $D_j$ of the mean values MDH and MDL of photometric data belonging to the corresponding regions. The weighted mean $D_j$ is expressed by the following formula:

$$D_j = K_a \cdot MDH + K_b \cdot MDL$$

$$K_a + K_b = 1 \qquad \ldots (2)$$

In this case, since it is necessary to suppress the influence of the mean value MDH concerning the high-saturation region, the value of the constant $K_a$ is set within the range from 0.0 to 0.4. However, when the images to be processed have greatly deviated colors, the mean value MDH concerning the high saturation region greatly influences the determination of the exposure, thereby making it impossible to appropriately compensate for the color failure. On the other hand, in the case of processing images formed using heterogeneous light sources, compensation can be effected by changing the values of the coefficients $K_a$ and $K_b$. However, a determination has to be made as to whether a heterogeneous light source was used or not, and if a wrong determination is made, the resultant printed images will deteriorate to a great extent. Japanese Patent Laid-Open No. 61-223731 (1986) proposes to determine the exposure by employing as the mean value MDH in the abovestated formula (2) a value $D_w$ indicative of an achromatic color. However, this method also encounters a similar problem. Since the value $D_w$ is obtained on the basis of the mean value MDH concerning the high-saturation region, the correction provided proves to be inappropriate with respect to films of various different film types or heterogeneous light-source negatives and, hence, inappropriate for the characteristics of the color images on such films.

SUMMARY OF THE INVENTION

The present invention has been made in order to overcome the above-described problems.

A first object of the present invention is to provide a method of determining a photographic printing exposure that is capable of compensating for the difference in density balance with respect to a film having a density balance different from that of a reference film type, and also capable of ensuring the production of good printed images during printing in a low- or high-density area of a film.

In order to achieve the above-stated first object, a first aspect of the present invention provides an exposure determining method in which measurement of light is effected with respect to a plurality of portions into which at least a part of, i.e., all or a part of film images on films to be subjected to printing are divided, thereby obtaining photometric data; and the exposure is determined on the basis of the printing exposure condition for a reference film type and also on the basis of image density values for three colors which are calculated on the basis of photometric data belonging to a specific color region of the film images to be printed. The method of the present invention further comprises the step of, before the determination of the exposure, correcting the printing exposure condition for the reference film type with respect to at least one color, selected on the basis of the difference in the three color density balance of one of the films to be subjected to printing from that of the reference film type, this correction being effected by applying a correction value calculated on the basis of the three color density balance of the film to be subjected to printing which the film possesses in either a high density area or a low-density area thereof.

The exposure determining method, in accordance with the first aspect of the present invention, may have an arrangement where, in the correction of the printing exposure condition for the reference film type, a color correction value for correcting that difference in the three color density balance of the film to be subjected to printing which the film exhibits in either a high-density area or a low-density area thereof, is calculated with respect to the at least one color. The color correction value is calculated using a function formula including previously set image density values, and the image density value for the at least one color which is among the image density values for three colors calculated on the basis of the photometric data belonging to the specific color region. Advantageous effects are provided if the color correction value increases from an intermediate-density area of the film to be subjected to printing toward either a high-density area or a low-density area of the film.

The color correction value Aj may be calculated using the following formula:

$$Aj = k1j \, (Dj - Daj)/(Dbj - Daj) + k2j \qquad \ldots (3)$$

(where j represents one color selected from the group consisting of red color, green color and blue color; Dj represents the image density value for the color j which is calculated on the basis of the photometric data belonging to the specific color region; Daj and Dbj represent the previously set density values with respect to the color j of which the respective magnitudes are in the mutual relationship of Dbj>Daj; and k1j and k2j are coefficients with respect to the color j for determininq the magnitude of the color correction value Aj which coefficients each include zero in its range but both cannot simultaneously equal zero). For instance, the coefficients k1j and k2j are within the following respective ranges: $0 \leq k1j \leq 2.0$ and $0 \leq k2j \leq 2.0$; alternatively, $0 \leq k1j 200$ and $0 \leq k2j \leq 200$.

The color correction value Aj may alternatively be calculated using a formula including the ratio Dj/Daj.

The method in accordance with the present invention may have an arrangement where, in the determination of the exposure, the image density values for three colors or values corresponding to these image density values are multiplied by the reciprocals of the gradients with respect to three colors in a specific density area of the reference film type.

Each of the three color density balance of the film to be subjected to printing and that of the reference film type may be determined from the gradients of the relevant film or the reference film type with respect to three colors.

With the exposure determining method in accordance with the first aspect of the present invention, photometric data is obtained by effecting measurement of light with respect to a plurality of portions of film images into which at least part of, i.e., all or a part of film images on films to be subjected to printing are divided. The exposure of one of the films to be subjected to printing is determined on the basis of the printing exposure condition of a reference film type and also on the basis of image density values for three colors which are calculated on the basis of photometric data belonging to a specific color region. A low-saturation color region including neutral colors may be used as this specific color region. Although the image density values for three colors may be calculated using only those photometric data belonging to the specific color region, as stated above, they may alternatively be calculated by using photometric data belonging to regions which are not the specific color region, after the data has been converted into a representative obtained from the photometric data belonging to the specific color region, for instance, into an average for each of three colors.

When the film to be subjected to printing has a three color density balance different from that of the reference film type, the exposure is determined by correcting the printing exposure condition for the reference film type with respect to at least one color which is selected on the basis of that difference in the density balance. The abovementioned one color is, for instance, the color pertaining to the greatest difference among the three.

In the correction of the printing exposure condition for the reference film type, this correction may be effected employing a color correction value, calculated using a function formula including previously set image density values, and the image density value for the above-mentioned one color which is in turn calculated on the basis of the photometric data belonging to the specific color region. Advantageous effects are provided if the color correction value increases from an intermediate-density area (normal-density area) of the film to be subjected to printing toward either a high-density area or a low-density area of the film. In general, the difference in the density balance becomes greater from an intermediate density portion of a characteristic curve toward either a high-density portion or a low-density portion of the curve. Accordingly, if the color correction value is increased in accordance with the level of density, as stated above, it is possible to suppress the effect of correction in the linear portion of the characteristic curve, and it is also possible to compensate for the difference in density balance throughout those density areas where there is difference in density balance, without causing any discontinuous changes in colors. The adoption of the arrangement where the color correction value is increased in accordance with the level of film density also makes it possible to compensate for influence by the failure of the reciprocity law on print paper, because the influence can be the greater, the higher the density that the characteristic curve corresponds to, even in the linear portion.

If the color correction value Aj is calculated using a function formula employing the difference between the above-specified image density value and a set density value, the correction value Aj is expressed by the above-stated formula (3).

In the formula (3), the set density value Dbj may be a previously-set, overexposed-image density value, such as the density value of an overexposed image on a condition setting film of the reference film type, while the set density value Daj may be the density of a normally exposed image on a condition setting film of the reference film type. The color correction value Aj may be calculated using the difference Dj−Daj between the image density value Dj with respect to one color and the set density value Daj, as in the formula (3). Alternatively, the value Aj may be calculated using the ratio Dj/Daj (where Daj is the normal density).

On the other hand, when a film of the reference film type or a film having characteristics similar to those of the reference film type is to be subjected to printing, in order to eliminate or make very small the effect of correction employing the above-described colr correction value, the exposure is determined by multiplying the above-described image density values for three colors, or values corresponding to these density values, by the reciprocals of the gradients with respect to three colors in a specific density area of the reference film type (e.g., in an intermediate-density area). By virtue of this arrangement, in the case of subjecting a film of the reference film type or a film whose characteristics are similar to those of the reference film type to printing, since the image density values obtained from the photometric data within the specific color region are modified in the manner specified above, deviation with respect to colors can be none or only very small, thereby permitting only a little influence by the color correction value.

As described above, according to the first aspect of the present invention, the difference in the three-color balance of a film to be subjected to printing, from that of the reference film type is compensated for. This provides the following advantageous effects. If the characteristic curve of the relevant film with respect to one color, relatively deviates to the high-density side (i.e., if the curve corresponds to a relatively highly contrasted tone) as compared with the corresponding characteristic curve of the reference film type, control is effected in such a manner as to compensate for influence by the failure of the reciprocity law on print paper, whereby the exposure with respect to this particular color is increased relative to the exposure with respect to the other two colors, so that the resultant color balance will accord with that obtainable with the reference film type. Conversely, if the characteristic curve of the relevant film with respect to one color, relatively deviates to the low-density side (i.e., if the curve corresponds to a relatively soft tone) as compared with the corresponding characteristic cure of the reference film type, control is effected in such a manner as to compensate for the influence of the non-linear portion of that film characteristic curve, whereby the exposure with respect to this particular color is reduced relative to exposure with respect to the other two colors, so that the resultant color balance will accord with that obtainable with the reference film type. In this way, it is possible to obtain a good color balance in either case.

If a color correction value is determined on the basis of a function formula, including the difference between or the ratio between a certain image density value and a previously set density value, and if the correction value is determined in such a manner that, the higher the density, the greater the effect obtained by the correction using the color correction value, this provides the following advantages: it is possible to make small the effect of correction in the linear portion of the film characteristic curve where correction is unnecessary; and it is simultaneously possible to enhance the effect of correction in the non-linear portion corresponding to high-densities, while any discontinuous changes in colors are prevented. Furthermore, it is possible to compensate for possible influence by the failure of the reciprocity law on print paper, which occurs with a density higher than that in the high-density area of the reference film type, and which cannot be controlled by slope control; and this compensation can be effected without causing any discontinuous changes in colors.

In the processing of a film of the reference film type or the like, by virtue of the arrangement where the image density values or the like are multiplied by the reciprocals of the gradients of the reference film type, it is possible to cope with the non-linear portions of the characteristic curves by using, as the reference, the density balance ranging from low densities to high densities, in such a manner that the effect of correction employing the color correction value is eliminated or made very small, while the slope control value is set to an optimum value. Thus, the reference exposure condition is utilized, with appropriate values being set for the colors and densities.

The present invention is also directed to the provision of a method of determining the exposure applicable to image copying equipment, that is capable of ensuring the production of correct copies from color photographic images of any kind, by preventing color failure during the exposure of the color photographic images, and by effecting compensation with respect to the color-photograph characteristics (including the sensitivities with respect to three colors and the balance therebetween, the gamma values and the balance therebetween, the balance between colors at the lowest density, and the configuration of the characteristic curves indicative of the relationship between the exposure and the density), and also with respect to the color of the light source, which is not daylight, used during photography.

In order to achieve the above-stated second object of the present invention, a second aspect of the present invention provides an exposure determining method comprising the steps of: effecting measurement of light with respect to red (R) light, green (G) light and blue (B) light and with respect to a plurality of portions into which original images are divided, thereby obtaining items of photometric data on three colors; classifying the items of photometric data on three colors by determining to which color regions the items of photometric data on three colors belong among a plurality of color regions into which at least one previously set color coordinate system is divided; selecting a color region or color regions in accordance with the number of items of those photometric data which belong to a specific color region; obtaining characteristic values with respect to the primaries using at least those photometric data belonging to the selected color region or regions; and determining the exposure on the basis of the characteristic values obtained.

The exposure determining method in accordance with the second aspect of the present invention may have the following arrangement: in the step of obtaining characteristic values with respect to the primaries, a weight is determined with respect to each of the selected color regions, the weight being either a weight varying in accordance with the magnitude of the color difference or of the color ratio, or a weight varying in accordance with the number of items of those photometric data belonging to the specific color region, and characteristic values are obtained on the basis of the photometric data and with respect to each of the selected color regions; and, in the step of determining the exposure, the characteristic values are each weighted by using the weight so as to obtain a weighted mean value, the exposure being determined on the basis of the thus obtained weighted mean value.

The specific color region may be either a color region whose color difference from a reference value is small, or a color region whose color ratio to a reference value is small.

The method may have the following arrangement: when the number of items of those photometric data belonging to the specific color region is above a predetermined value including zero, the photometric data belonging to either a color region whose color difference from a reference value is large, or a color region whose color ratio to a reference value is large, is not used in the determination of exposure, or is used in the determination of exposure after having been converted into a certain value. On the other hand, when the number of items of those photometric data belonging to the specific color region is below a predetermined value including zero, those photometric data belonging to either a color region whose color difference from a reference value is large or a color region whose color ratio to a reference value is large is used in the determination of exposure.

The above mentioned certain value may be one value selected from the group consisting of the reference value, a representative of photometric data belonging to a color region whose color difference from a reference value is small, and a representative of photometric data belonging to a color region whose color ratio to a reference value is small.

With the exposure determining method in accordance with the second aspect of the present invention, a plurality of color regions into which at least one previously set color coordinate system is divided are provided therein. A color coordinate system which may be used as this previously set color coordinate system is a two dimensional or three-dimensional coordinate system whose coordinate axes each represent the value of either one color of the primaries or a combination of two or more colors of the primaries, the value being, for instance, $Dx-Dy$, $Dx/Dy$, $Dx/(Dx+Dy+Dz)$, $Dx+Dy+Dz$, $Dx-K$, $Dx/K$ (where x, y, z represent individual colors of R, G and B, and K represents a constant). The color regions of the color coordinate system may comprise a plurality of color regions determined on the basis of the distance on the color coordinate system either from the origin of the coordinate system or from a point indicative of a reference value. A value which may be used as this reference value is, for instance, a value concerning a specific color of the original images, a value calculated from averages concerning a plurality of images, the minimum value of the photometric data, a value calculated from the photometric data on specific images, or a predetermined constant. The reference value may alternatively be determined using a function formula or a table. In this case, the reference value may be a value determined from a function formula or a table in such a manner that it changes in accordance with, e.g., the image density. The specific color of the original images may be one color selected from the group consisting of a neutral color, a flesh color, and a color determined from an average concerning a plurality of images.

The photometric data are obtained by measuring light with respect to R light, G light and B light and with respect to a plurality of portions into which the original images are divided. Calculation is performed on each of the items of the photometric data so that each item of data is converted into a point on the at least one color coordinate system. The items of data are then classified by determining to which color region each item belongs among a plurality of color regions previously set on the one or a plurality of color coordinate systems. After classification, a color region or color regions are selected in accordance with the number of items of those photometric data belonging to a specific color region (e.g., a region whose color difference from or color ratio to a reference value is small, that is, a neutral color region or a lowsaturation region). Characteristic values with respect to the primaries are calculated using at least those photometric data belonging to the selected color region or regions. The exposure is determined on the basis of the characteristic values.

In the case of an original resulting from photography in daylight, the number of items of those photometric data belonging to the specific color region is above a predetermined value including zero. In this case, therefore, a photometric value belonging to a color region whose color difference from or color ratio to a reference value is large is not used in the determination of the exposure, or is used in the determination of the exposure after having been converted into a certain value. By virtue of this arrangement, it is possible to prevent the occurrence of color failure. This certain value may be the reference value or a representative of those photometric data belonging to a region whose color difference from or color ratio to a reference value is small. The representative value may be, for instance, the mean value of those photometric data belonging to a region whose color difference from or color ratio to a reference value is small, the central value of these photometric data, one of the values constituting these photometric data (e.q., the value whose color difference from or color ratio to the reference value is the smallest, or the maximum value of these photometric data), or the value indicative of the color difference or color ratio of an average calculated from these photometric data. The representative value may alternatively be the mean value of the photometric data belonging to a certain color region, to which at least the photometric data on the color images belong, whose color difference or color ratio is the smallest.

On the other hand, in the case of an original resulting from photography using a heterogeneous light source, the number of items of those photometric data belonging to the specific color region is below the predetermined value including zero. In this case, therefore, certain photometric data belonging to a region whose difference from or ratio to a reference value is large is used in the determination of the exposure. By virtue of this arrangement, it is possible to compensate for the light source color resulting from the photography using a light source which is not daylight.

The influence of the type of light source used during photography is represented by the number of items of those photometric data belonging to the specific color region. If the plurality of color regions are determined in accordance with the magnitude of the color difference or color ratio, it is possible to have these color regions each represent the influence of the type of light source used during photography. Accordingly, the method may have an arrangement where, a weight is determined with respect to each of the selected color regions, the weight varying either in accordance with the magnitude of the color difference or of the color ratio, or in accordance with the number of items of those photometric data belonging to the specific color region, and characteristic values are obtained on the basis of the photometric data and with respect to each of the selected color regions; and the characteristic values are each weighted by using the weight so as to obtain a weighted mean value, on the basis of which the exposure is determined.

As described above, according to the second aspect of the present invention, it is possible to prevent the occurrence of color failure, and also to determine the correct exposure even with respect to an original resulting from photography using a heterogeneous light source such as a fluorescent lamp or a tungsten lamp, thereby ensuring the production of good color copy images.

In order to achieve the second object of the present invention, a third aspect of the present invention provides a further exposure determining method comprising the steps of: effecting measurement of light with respect to red (R) light, green (G) light and blue (B) light and with respect to a plurality of portions into which color photographic images are divided, thereby obtaining items of photometric data on three colors;

classifying the items of photometric data on three colors by determining to which color regions the items of photometric data on three colors belong along a plurality of color regions into which at least one previously set color coordinate system is divided; defining, as first image-data, those photometric data belonging to either a color region whose color difference from a reference value is small or a color region whose color ratio to a reference value is small, and also defining, as second image-data, a representative of the first image data or the reference value; and determining the exposure on the basis of characteristic values with respect to the primaries which are obtained from the first image-data and the second image-data.

The exposure determining method in accordance with the third aspect of the present invention may have an arrangement where, in determining the exposure, at least part of those items of photometric data which belong to, either a color region whose color difference from the reference value is large or a color region whose color ratio to the reference value is large, is converted into second image-data, the exposure being determined on the basis of characteristic values with respect t the primaries which are obtained from the first image data and the second image-data.

Each of the above-mentioned characteristic values with respect to the primaries may be a weighted mean value of a characteristic value obtained from the first image data and a characteristic value obtained from the second image data The third aspect of the present invention provides a still further exposure determining method comprising the steps of: effecting measurement of light with respect to red (R) light, green (G) light and blue (B) light and with respect to a plurality of portions into which color photographic images are divided, thereby obtaining items of photometric data on three colors; classifying the items of photometric data on three colors by determining to which color regions the items of photometric data on three colors belong among a plurality of color regions into which at least one previously set color coordinate system is divided; determining the exposure on the basis of characteristic values with respect to the primaries which are obtained from those photometric data belonging to either a color region whose color difference from a reference value is small or a color region whose color ratio to a reference value is small, and also on the basis of one value selected from the group consisting of the reference value and a representative of those photometric data belonging to either a color region whose color difference from a reference value is small or a color region whose color ratio to a reference value is small.

The "plurality of color regions" into which the color coordinate system is divided, mentioned in the abovespecified methods, may comprise at least two color regions determined on the basis of the distance on the color coordinate system from a point indicative of either a value concerning a specific color of said photographic images, or a reference value calculated from a plurality of images. The "specific color", mentioned in the above-specified methods, may be one color selected from the group consisting of a neutral color, a flesh color, and a color determined from an average concerning the plurality of images.

The "representative", mentioned in the above-specified methods, may be the mean value of those photometric data belonging to a certain color region to which at least those photometric data on the color photographic images belong, whose color difference from the reference value or color ratio to the reference value is the smallest.

The "color coordinate system", mentioned in the above-specified methods, may be the same as that used in the method in accordance with the second aspect of the present invention.

The color regions of the color coordinate system may be determined on the basis of the distance on the color coordinate system either from the origin of the coordinate system or from a point indicative of a reference value, which will be described below According to the third aspect of the present invention, photometric data are obtained by measuring light with respect to R light, G light and B light and with respect to a plurality of portions into which color photographic images are divided. Calculation is performed on each of the items of the photometric data so that each item of data is converted into a point on the at least one color coordinate system. The items of data are then classified by determining to which color region each item belongs among a plurality of color regions which are previously set on the one or a plurality of color coordinate systems. A representative is calculated from those photometric data belonging to either a color region whose color difference from a reference value is small or a color region whose color ratio to a reference value is small (i.e., calculated from first image-data). A value which may be used as the above-mentioned reference value is, for instance, a value concerning a specific color of the photographic images, a value calculated from averages concerning a plurality of images, the minimum value of the photometric data, a value calculated from the photometric data on specific images, or a predetermined constant. The reference value may alternatively be determined using a function formula or a table. In this case, the reference value may be a value determined from a function formula or a table, in such a manner that it changes in accordance with, e.g., the image density. The specific color of the photographic images may be one color selected from the group consisting of a neutral color, a flesh color, and a color determined from an average concerning a plurality of images. The representative value may be, for instance, the mean value of those photometric data belonging to a region whose color difference from or color ratio to a reference value is small, the central value of these photometric data, one of the values constituting these photometric data (e.g., the value whose color difference from or color ratio to a reference value is the smallest, or the maximum value of these photometric data), or the value indicative of the color difference or color ratio of an average calculated from these photometric data. The representative value may alternatively be the mean value of those photometric data belonging to a certain color region to which at least those photometric data on the color images belong, whose color difference or color ratio is the smallest. In this way, since the representative is calculated, on the basis of those photometric data belonging to a color region whose color difference from or color ratio to a reference value is small, that is, on the basis of photometric data involving only a small degree of deviation in color, it is possible to have the thus calculated representative to represent the characteristics of the color photographic images which may be formed on films of different kinds or types (in terms of, e.g., their sensitivity, manufacturer, or use). If that color region includes the reference value, the representative is a value approximate to the reference value. If the reference value is determined in accordance with the film type, the reference value may be used instead of the representative.

All or part of the items of the photometric data, which belong to either a color region whose color difference from the reference value is large or a color region whose color ratio to the reference value is large, may be each converted into a representative or a reference value which is calculated in the above described manner (i.e., into second image-data), the exposure being determined on the basis of characteristic values with respect to the primaries which are obtained from the first image data and the second image-data. The first image-data is photometric data belonging to a color region whose color difference from or color ratio to a reference value is small, while the second image-data is data obtained on the basis of a representative obtained from the first image-data or of the reference value. Values which may be used as the characteristic values with respect to the primaries are values for three colors which are obtained from, e.g., mean values or weighted mean values obtained from the first and second image-data, or averages of those photometric data which include neither large values nor small values. The exposure may alternatively be determined on the basis of characteristic values obtained from the first-image data and on the basis of either a representative, such as that described above, or the reference value. When photometric data is converted into a representative, it is preferred that the proportion of data converted into the representative be made greater, the greater the color difference or color ratio that the color regions correspond to.

As described above, according to the third aspect of the present invention, since, in the determination of the exposure, a representative obtained from photometric data involving only a small degree of deviation is used among the entire photometric data which may involve a high degree of deviation, it is possible to determine the correct exposure even during processing of images formed on films of different types. Furthermore, it is possible to prevent the occurrence of color failure. In this way, the methods are capable of producing good color print images with a higher level of stability than that conventionally achievable.

BRIEF DESCRIPTION OF THE DRAWINGS

FIGS. 1 to 15 are views mainly used to explain a first embodiment of the present invention, in which;

FIG. 1 is a schematic view showing an automatic color photographic printer employing an additive color process, to which a method in accordance with a first aspect of the present invention may be applied;

FIG. 2 is a plan view of a rotary disk with filters of the printer shown in FIG. 1;

FIG. 3 is a schematic view showing the filter shown in FIG. 2;

FIG. 4 is a graph showing the characteristics of the R filter;

FIGS. 5 (1), (2) and (3) are graphs showing the spectral sensitivity distribution of color paper and a two-dimensional image sensor, and the characteristics of filters in an additive color process;

FIGS. 6 (1) and (2) are graphs showing examples of characteristic curves;

FIGS. 7 (1), (2) and (3) are graphs used to explain film characteristics;

FIG. 8 is a graph showing a specific region for selecting photometric values;

FIG. 9 is a graph showing the curve for converting the photometric values;

FIG. 10 is a flowchart for calculating density values for exposure control;

FIG. 11 is a diagram showing color regions;

FIG. 12 is schematic view showing an automatic color photographic printer employing a white light subtractive color process, to which the method in accordance with the first aspect of the present invention may be applied;

FIGS. 13 (1), (2) and (3) are graphs showing the spectral sensitivity distribution of color paper and a two-dimensional image sensor, and the characteristics of filters in a subtractive color process;

FIG. 14 is a graph showing the characteristic curves of paper of which the characteristic with respect to B light deviates to the high-density side; and FIG. 15 is a graph used to explain the gamma balance value.

FIG. 20 is a schematic view showing an automatic printer used in third and fourth embodiments of the present invention;

FIG. 24 is a schematic view showing an automatic printer used in a fifth embodiment of the present invention; and FIG. 25 is a graph showing still other examples of color regions.

DESCRIPTION OF THE PREFERRED EMBODIMENTS

Embodiments of the present invention will be described hereunder with reference to the drawings. In a first embodiment, the method in accordance with the first aspect of the present invention is applied to an automatic color photographic printer employing an additive color process, such as that shown in FIG. 1, or to an automatic color photographic printer employing a white light subtractive color process, such as that shown in FIG. 12. The method will be described first as applied to an automatic color photographic printer employing a white light subtractive color process, shown in FIG. 1.

Figure 1:
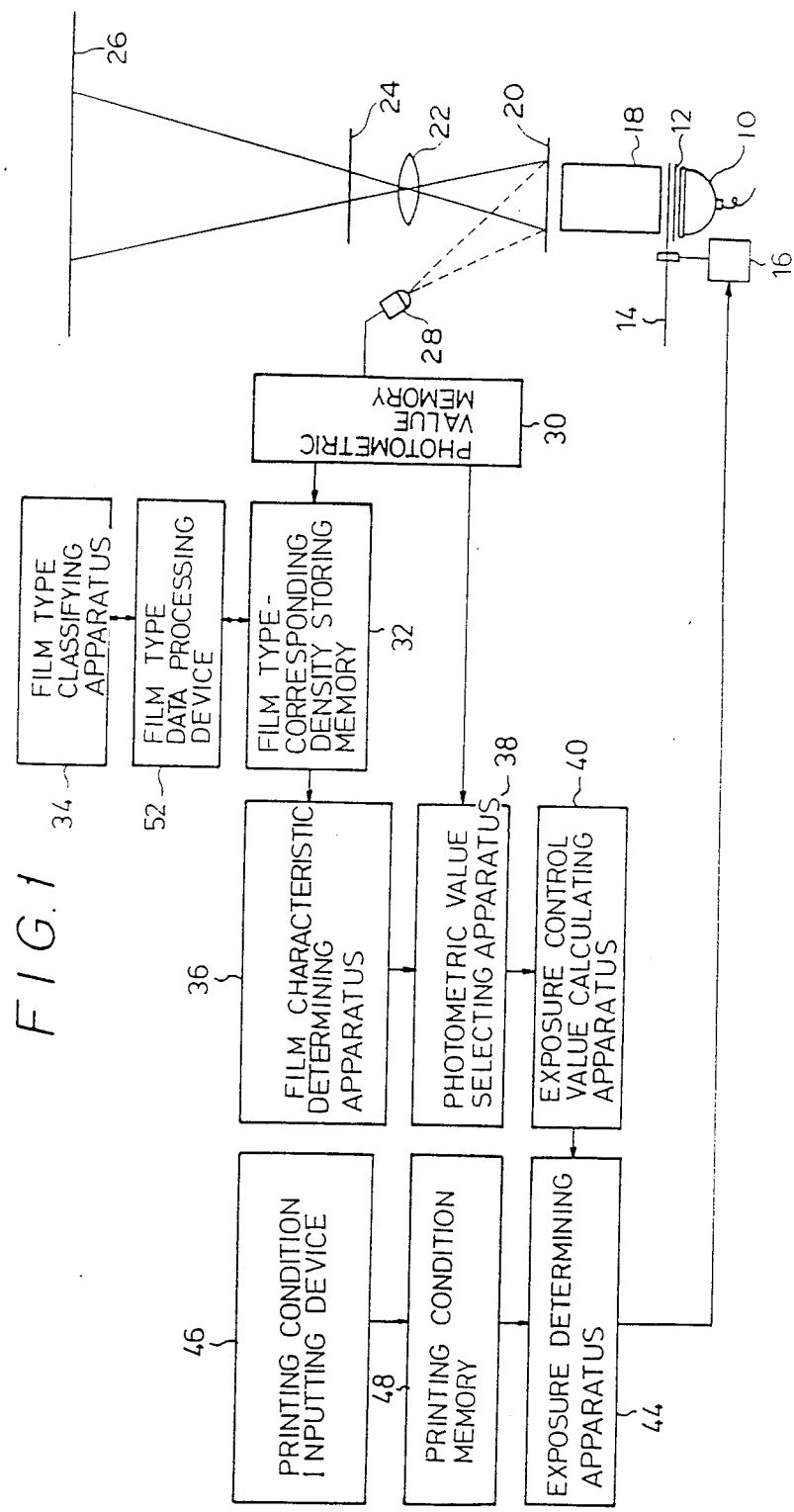

As shown in FIG. 1, a color negative film 20 is set in a negative carrier (not shown) and fed thereby to a printing portion of the printer. A mirror box 18 and a lamp house 10 provided with a halogen lamp are disposed in this order below the color negative film 20, as viewed in the figure. A rotary disk 14 which can be rotated by a motor 16, and an infrared cutting filter 12 are inserted in this order between the mirror box 18 and the lamp house 10.

Figure 2:
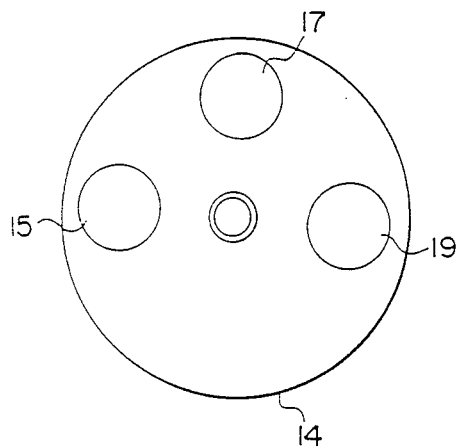
Figure 3:
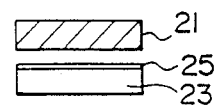
Figure 4:
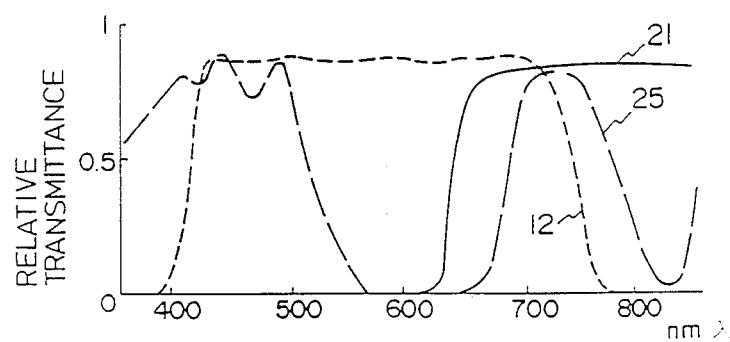

As shown in FIG. 2, the rotary disk 14 has, on its peripheral portion, separation filters, namely, a G filter 15, a B filter 17, and a R filter 19. Each of the G filter 15, the B filter 17 and the R filter 19 has a structure in which, as shown in FIG. 3, a white glass sheet 23 coated with a dielectric multi-layer film 25 and a colored glass sheet 21 of one of the colors R, G and B are disposed in parallel to each other. FIG. 4 is a graph showing a state in which the colored glass filter 21 (e.g., R-64 filter, a product of Hoya Glass) and the dielectric multi-layer film 25 from R short wavelengths, while the thermally stable infrared cutting filter 12 is used to form R long wavelengths.

Above the negative film 20, a lens 22, a black shutter 24, and a color paper 26 are disposed in this order. The members described above form an image-forming optical system. Specifically, when light is projected from the lamp house 10, it passes through the infrared cutting filter 12, the filters on the rotary disk 14, the mirror box 18, and the color negative film 20; and an image is formed by the lens 22 on a portion of the color paper 26.

Figure 17:
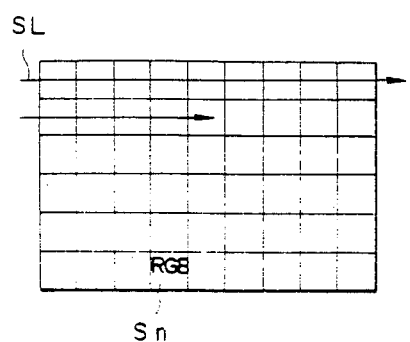
FIG. 17 is a view showing a state where light is measured with respect to a plurality of portions into which negative images are divided.

A two-dimensional image sensor 28 is disposed at a position at which the sensor 28 obliquely faces the optical axis of the image-forming optical system, and is capable of performing light measurement concerning the image density of the negative film 20. The two-dimensional image sensor 28 has a storage-type photoelectric conversion device such as a CCD or MOS, an optical system for forming an image of the negative film 20 on the photoelectric conversion device, and a signal processing circuit for processing the output of the photoelectric conversion device, and for outputting the resultant output as image information. The photoelectric conversion device of the image sensor 28 measures light with respect to the primaries R, G and B and with respect to each of a plurality of negative image portions Sn into which images on the negative film 20 are divided, as shown in FIG. 17, the negative image portions being scanned along scanning lines SL. The signal processing circuit converts the output of the photoelectric conversion device into digital signals, converts the reciprocals of the signal values into the corresponding logarithms, and then outputs density signals The infrared cutting filter 12 is able to exhibit a characteristic such as that indicated by the one-dot chain line in FIG. 5 (3), while the separation filters 15, 17 and 19 of the rotary disk 14 are able to exhibit relative spectral transmittance such as those indicated by solid lines in FIG. 5 (3). The two-dimensional image sensor 28 is able to exhibit the relative spectral sensitivity distribution indicated by the solid line in FIG. 5 (2), and the sensor 28 is able to exhibit, in an additive color process, the spectral sensitivity distribution indicated by broken lines in FIG. 5 (2). The relative spectral sensitivity distribution on the color paper 26 is indicated by solid lines in FIG. 5 (1), while the spectral sensitivity distribution in an additive color process is indicated by broken lines in FIG. 5 (1).

As shown in FIG. 1, the two-dimensional image sensor 28 is connected to a photometric value memory 30 for storing the values of density signals concerning R, G and B (i.e., for storing photometric data) which have been output from the two-dimensional image sensor 28. The photometric value memory 30 is in turn connected to a film type-corresponding density storing memory 32 and also to a photometric value selecting apparatus 38. The film type-corresponding density storing memory 32 is connected to a film type classifying apparatus 34. The film type-corresponding density storing memory 32 is also connected via a film characteristic determining apparatus 36 to the photometric value selecting apparatus 38. The photometric value selecting apparatus 38 is connected via an exposure control value calculating apparatus 40 to an exposure determining apparatus 44. A printing condition inputting apparatus 46 is connected via printing condition memory 48 to the exposure determining apparatus 44. The exposure determining apparatus 44 controls the exposure by controlling the motor 16 which in turn causes the rotation of the rotary disk 14.

The operation of the first embodiment will now be described, with explanations being given concerning each of the blocks shown in FIG. 1.

The film type classifying apparatus 34 is operable to distinguish one film in a series of films from others, and to classify each of the films. The films are classified into film types in such a manner that the same film type is maintained throughout one film strip; also, those negative films which have, in common, some of the factors concerning, e.g., the manufacturer, the pigment materials, the γ value, the base density, the light sensitivity and the configuration of the characteristic curves, are classified as the same film type. The film type classifying apparatus 34 may be combined with a DX code reader for reading the so-called DX codes already provided on the edge portions of the negative films. A DX code indicates, in the form of a bar code, information indicative of the kind of a film, such as the title of the manufacturer of the film, and the film family. Accordingly, when a DX code reader is used, the kind of the film can be detected. On the basis of this detection, it is possible to classify films to be subjected to printing into a plurality of film types, each film type including a kind or kinds of films which have the same or similar characteristics. In order to classify the films into film types, however, a different arrangement may be adopted. For instance, it is possible to use an apparatus for detecting the peak value of the transmission density of a negative film with respect to a certain wavelength that is characteristic of the film, thereby detecting the characteristic of a pigment material used in the film, and thereby classifying the film on the basis of the detection. Alternatively, the film classifying apparatus 34 may include a keyboard allowing the operator to make judgment as to the classification of the films into film types, and manually input necessary data. Still alternatively, the apparatus used may be simply operable to detect the beginning and the end of one film, and that the film is among a series of films.

The printing condition inputting apparatus 46 and the printing condition memory 48 allow the inputting and storing of printing conditions (printing exposure conditions) with respect to R, G and B which may be used during printing using a reference film type, e g., Super HR100 (a name of a product manufactured by Fuji Film). These printing conditions concern at least one of the exposure, the exposure time, the filter amount, the light source luminance, the light source voltage, and the slope control value. The printing exposure conditions are set using condition setting films.

The film type corresponding density storing memory 32 operates to accumulate and store values output from the photometric value memory 30 with respect to each of the film types into which the films have been classified by the film type classifying apparatus 34. In this operation, the art disclosed in, for instance, Japanese Patent Laid-Open No. 61-267749 (1986) may be used. That is, the density of a standard negative is obtained by accumulating densities each corresponding to a light measurement point, an image portion, or all the images of a negative, and by calculating the average of these densities. The average is stored as the standard negative density. Another method may be adopted in which values output from the photometric value memory 30 are accumulated and stored only with respect to a series of films.

Figure 6:
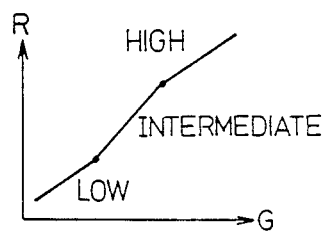
Figure 6:
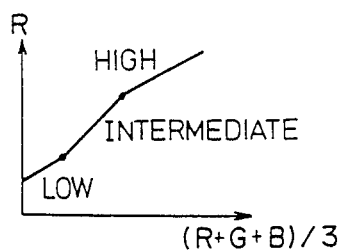

The film characteristic determining apparatus 36 determines the characteristics of the films on the basis of the densities with respect to R, G, and B which are stored in the film type corresponding density storing memory 32. Descriptions will be given below concerning an example in which the gradient (i e, the $\gamma$ value) of the film characteristic curves is used as the characteristic of a film. First, the characteristic curves with respect to R, G and B of one of the films to be subjected to printing are obtained by calculating the ratio, of each of the density values with respect to R, G and B (hereinafter referred to as "density value R", etc.), which are stored in the film type-corresponding density storing memory 32, to a reference value such as the density value G, or an average $(R+G+B)/3$ of the density values R, G and B. FIG. 6 (1) shows a characteristic curve representing the relationship of the density value G with the density value R. FIG. 6 (2) shows a characteristic curve representing the relationship of the density value R with respect to the average density $(R+G+B)/3$.

Figure 7:
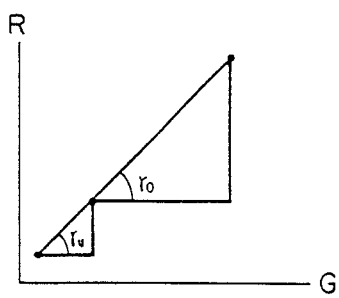
Figure 7:
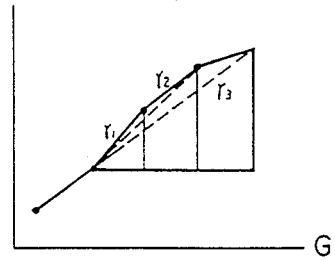
Figure 7:
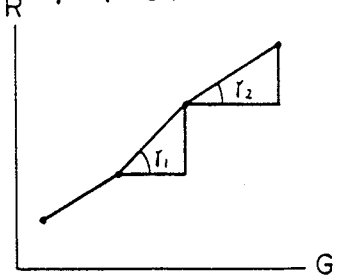

The characteristic of that particular film may be determined, for instance, in the following manner. As shown in FIG. 7 (1), a gradient $\gamma_U$ of an underexposure portion and a gradient $\gamma_O$ of an overexposure portion may be used. Alternatively, the average of gradients $(\gamma_1+\gamma_2+\gamma_3)/3$ shown in FIG. 7 (2), or the gradients $\gamma_1$ and $\gamma_2$ shown in FIG. 7 (3) may be used. Although in the above-described arrangement, the characteristic of the relevant film is automatically determined using the film type-corresponding density storing memory 32 and the film characteristic determining apparatus 36, these may be omitted. In this case, data on film characteristics may be stored in a memory (a film characteristic memory) so that the necessary item of data is read from the memory by the film type classifying apparatus 34 and then input to the photometric value selecting apparatus 38.

Figure 8:
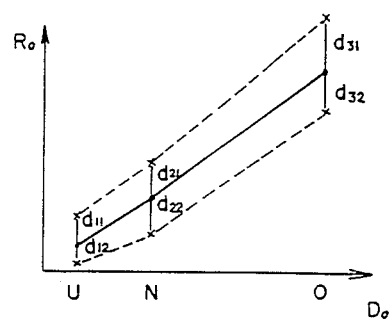

The photometric value selecting apparatus 38 selects, in accordance with the thus determined film characteristic, photometric values which are used to calculate density values for exposure control. Specifically, the selecting apparatus 38 selects, in accordance with the film characteristic determined by the film characteristic determining apparatus 36, those photometric values, from among the data stored in the photometric value memory 30, which belong to a specific color region set on a color coordinate system whose coordinate axes represent the difference $(R'-G')$ between the density values R and G, and the difference $(G'-B')$ between the density values G and B ($R'$, $G'$ and $B'$ being values described later). The specific color region is, for instance, a color region including a neutral color (e.g., gray) and a flesh color. Descriptions given below concern an example of the manner in which photometric values that belong to a specific color region are obtained. First, the density values $R_0$, $G_0$ and $B_0$ of a standard negative film with respect to three colors, as well as the average $D_O=(R_0+G_0+B_0)/3$ of these density values are used to obtain a curve, such as that shown in FIG. 8, with respect to each of the standard density values $R_0$, $G_0$ and $B_0$ (FIG. 8 showing the case of $R_0$). Furthermore, in order to allow data within ranges close to the specified color region to be included, offset amounts $d_{11}$ and $d_{12}$, $d_{21}$ and $d_{22}$, and $d_{31}$ and $d_{32}$ are set with respect to each of underexposure, normal exposure, and overexposure portions, thereby defining the region indicated by broken lines in FIG. 8. Subsequently, the average $D=(R+G+B)/3$ of the photometric values R, G and B concerning the film is calculated, and a determination is made as to whether the photometric value R corresponding to the average value D is included within the region indicated by the broken lines in FIG. 8. A similar determination is also made with respect to each of the photometric values G and B, as to whether they are included within respective regions, each being such as that indicated by the broken lines in FIG. 8. The photometric values R, G and B are selected and used in the calculation of density values for exposure control only if all these photometric values R, G and B are included in the regions, such as that shown in FIG. 8, which are set with respect to density values $R_0$, $G_0$ and $B_0$ of a standard negative film. If any of the photometric values R, G and B is not included in the region, the photometric value is not used to calculate density values for exposure control; alternatively, the value is converted into, for instance, an average of the photometric values R, G and B, or the average of those photometric values belonging to the region, such as that shown in FIG. 8, so that all these values are used in the calculation of exposure controlling density values. The above-described offset amounts $d_{11}$ to $d_{32}$ should preferably be changed in accordance with the type of film or with the gradients $R_0/D_0$, $G_0/D_0$, and $B_0/D_0$.

Figure 9:
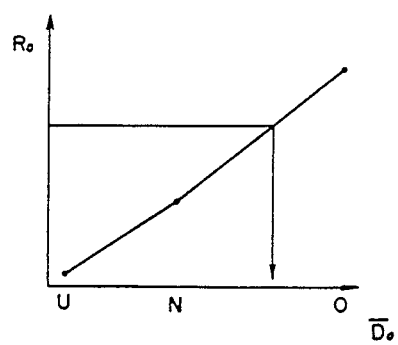

The above-described photometric values may alternatively be selected in the following manner. A characteristic curve such as that described above with reference to FIG. 8 is determined with respect to each of the density values $R_0$, $G_0$ and $B_0$ of a standard negative, as shown in FIG. 9. Each of these characteristic curves is used to convert each of the photometric values R, G and B into an average $\overline{D_0}$ by the method disclosed in Japanese Patent Laid-Open No. 60-27352 (1985), thereby obtaining density values $R'$, $G'$ and $B'$. By this conversion, certain photometric values assuring the same color balance as that of a standard negative film, are converted into equivalent density values $R'$, $G'$ and $B'$. Subsequently, a determination is made, on the chromaticity diagram, as to whether these density values $R'$, $G'$ and $B'$ should be used to calculate density values for exposure control. The selection of the photometric values to be used for this purpose may be performed by effecting the weightinq of the photometric values, as disclosed in Japanese Patent Laid-Open Nos. 61-198144 (1986) and 61-223731 (1986).

The exposure control value calculating apparatus 40 calculates density values for exposure control, using the photometric values selected by the photometric value selecting apparatus 38. Specifically, the calculating apparatus 40 classifies the photometric values, and, on the basis of density values obtained from the result of the classification, calculates exposure controlling density values, by the method disclosed in Japanese Patent Laid-Open Nos. 61-198144 (1986), 61-223731 (1986), and 61-232442 (1986). Referring to FIG. 10, Steps 100 to 104 are executed by the photometric value selecting apparatus 88. In Step 100, the selecting apparatus 38 operates to normalize the density values with respect to each of the plurality of light-measurement points, using as the origins those points corresponding to the specified color region. In the following Step 102, the normalized density values R', G' and B' are used to calculate the differences R'−G' and G'−B'. In Step 104, the selecting means 38 determines color regions, such as those shown in FIG. 11, from a color coordinate system table, the regions each corresponding to each of the measurement points. Thereafter the selecting apparatus 38 selects measurement points which belong to a closed region on a color coordinate system that includes a neutral color, or a flesh color, or both a neutral color and a flesh color. For instance, the measurement points belonging to the regions 0 (neutral color) shown in FIG. 11, or the regions 1 and 3 (flesh color) are selected. Subsequently, the exposure control value calculating apparatus 40 operates to obtain the total of the density values at the selected measurement points before the normalization, and calculate an average with respect to each of R, G and B, so that these averages may be used as exposure controlling density values. Because the exposure control density values are obtained from density values, none of which is a density value that may result in color failure, the thus obtained density values can be used to determine the exposure without causing any reduction in the level of color correction.

The exposure determining apparatus 44 determines the exposure to be used during printing of one of the films to be printed using, the printing conditions for a reference film type which are stored in the printing condition memory 48, and the exposure controlling density values calculated by the exposure control value calculating apparatus 40. The exposure determining means 44 determines the exposure in accordance with, e.g., the formulas (10) given below.

Various formulas used to obtain the exposure determining formulas (10) will be described. When reference film type normal densities for setting printing conditions for the reference film type (corresponding to the printing exposure conditions for the reference film type) with respect to three colors R, G and B are represented by RN, GN and BN, respectively, and the exposure controlling density values with respect to three colors R, G and B and for the negative to be subjected to printing are represented by DR, DG and DB, respectively, exposure amounts er, eg and eb with respect to three colors R, G and B are expressed as follows in terms of the logarithm thereof:

$$\begin{bmatrix} \text{Log } er \\ \text{Log } eg \\ \text{Log } eb \end{bmatrix} = \begin{bmatrix} X11 & X12 & X13 \\ X21 & X22 & X23 \\ X31 & X32 & X33 \end{bmatrix} \begin{bmatrix} dR \\ dG \\ dB \end{bmatrix} \quad (4)$$

where dR=DR−RN, dG=DG−GN, dB=DB−BN, and X11 to X33 are coefficients expressed by the following formulas:

$$\left. \begin{array}{l} X11 = SC(1.0 + 2.0\,A_R)/3 \\ X12 = X13 = SC(1.0 - A_R)/3 \\ X21 = X23 = SM(1.0 - A_G)/3 \\ X22 = SM(1.0 + 2.0\,A_G)/3 \\ X31 = X32 = SY(1.0 - A_B)/3 \\ X33 = SY(1.0 + 2.0\,A_B)/3 \end{array} \right\} \quad (5)$$

(where SC, SM and SY represent slope control values for R, G and B, respectively, which are expressed by SC=SCO, SM=SMO, SY=SYO ("O" in these equations expressing overslope) when dR>0, dG>0 and dB>0, and by SC=SCU, SM=SMU, SY=SYU ("U" in these equations expressing underslope) when dR<0, dG<0 and dB<0; $A_R$, $A_G$, and $A_B$ (expressed generally as Aj) are color CorrectiOn values for effecting color correction with respect to R, G and B)

Subsequently, when the above-stated formulas (4) are developed, with X11 to X33 being substituted using the formulas (5), and are rewritten using the relationship (dR+dG+dB)/3=dW, the following formulas (6) are obtained:

$$\left. \begin{array}{l} \text{Log } er = SC\{A_R(dR - dW) + dW\} \\ \text{Log } eg = SM\{A_G(dG - dW) + dW\} \\ \text{Log } eb = SY\{A_B(dB - dW) + dW\} \end{array} \right\} \quad (6)$$

When Aj=1.0, this leads to a normal correction; when Aj>1.0, a high correction; and when Aj<1.0, a lowered correction. In this embodiment, the color correction values Aj ($A_R$, $A_G$, and $A_B$) are determined, for instance, in the following manner:

$$\left. \begin{array}{l} A_R = K11\,(DR - RN)/(RO - RN) + K21 \\ A_G = K12\,(DG - GN)/(GO - GN) + K22 \\ A_B = K13\,(DB - BN)/(BO - BN) + K23 \end{array} \right\} \quad (7)$$

(where 0≦K11, K12, K13≦2.0, and 0≦K21, K22, K23≦2.0; $A_R$=K21 when DR<RN, $A_G$=K22 when DG<GN, and $A_B$=K23 when DB<BN; and RO, GO and BO represent over density values used in the setting of conditions for the reference film. When K11=0.5 and K21=1.0, $A_R$ is 1.0 if DR is at the normal density RN, whereas $A_R$ is 1.5 if DR is at the over density RO. It would be easily understood that other values may be used as RN, GN, BN, RO, GO and BO in the above formulas)

Each of the color correction values Aj is calculated using the corresponding formula (7) including both the image density value with respect to one color (DR, DG, or DB, generally expressed as Dj) and previously set density values (RN, GN or BN, serving as the previously set density value Daj, and RO, GO or BO, serving as the previously set density value Dbj), so that the color correction value Aj becomes larger as the density grows from intermediate to high. This is, however, a mere example, and the manner in which Aj may be calculated is not limited to that where the formulas (7) are used. For instance, the color correction value Aj may alternatively be determined as a table value from a table having various values of Aj in correspondence with various image density values. Still alternatively, the color correction values may be determined from, e.g., the following formulas:

$$A_R = K11\ (DR - DN)$$
$$A_G = K12\ (DG - DN)$$
$$A_B = K13\ (DB - DN)$$

If the color correction values Aj are determined using the above-described formulas, the color correction values Aj have great influence on the non linear exposure range within the hiqh-density area or on the failure of the reciprocity law on print paper, in the correction of the printing exposure conditions for the reference film type.

Figure 15:
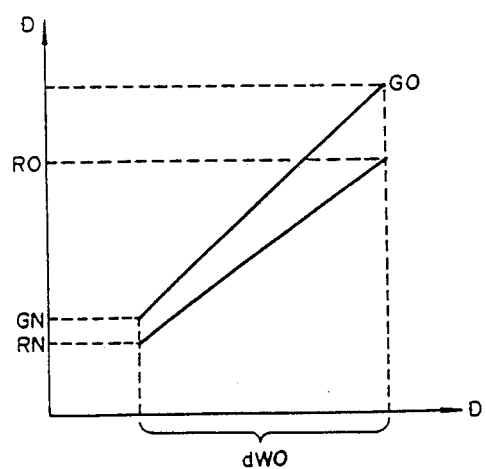

Furthermore, in this embodiment, gamma balance correction values Pj are used to achieve a color balance level equivalent to that obtainable with the reference film type. It suffices if values corresponding to the reciprocal of the γ value of the reference film type are used as the correction values Pj. When dWO is an average of the over density values RO, GO and BO with respect to three colors R, G and B and relative to the respective normal density values RN, GN and BN serving as the reference, as shown in FIG. 15, and the average dWO is expressed as $$dWO = \{(RO-RN)+(GO-GN)+(BO-BN)\}/3 \quad \ldots (8),$$

the gamma balance correction values Pj ($P_R$, $P_G$, $P_B$) are expressed as follows:

$$P_R = dWO/(RO - RN)$$
$$P_G = dWO/(GO - GN) \quad (9)$$
$$P_B = dWO/(BO - BN)$$

By virtue of the adoption of the gamma balance correction values Pj, the difference in gradient between three colors (i.e., in density balance) is compensated for.

When these correction values Pj are used, the exposure amounts er, eg and eb are expressed by the following formulas(10):

$$\text{Log } er = SC\ \{A_R \cdot P_R \cdot (dR - dW) + dW\}$$
$$\text{Log } eg = SM\ \{A_G \cdot P_G \cdot (dG - dW) + dW\} \quad (10)$$
$$\text{Log } eb = SY\ \{A_B \cdot P_B \cdot (dB - dW) + dW\}$$

With the exposure amounts er, eg and eb being expressed as the formulas(10), it is possible to determine exposure control vales Er, Eg and Eb when various parameters such as the inherent parameters of the automatic printer used, and parameters of a copying photosensitive material, are set.

If RO, GO and BO in the relevant formulas are substituted by RU, GU and BU, respectively, the resultant formulas can be used with respect to the low-density ranges.

When the exposure amounts for the film to be printed are determined from the above described formulas (10), if the film is of the reference film type, the correction value Aj has no or only a very little influence, and the magnitude of the influence of the correction value Aj is varied in accordance with the difference in three color density balance of the film to be printed from the reference film. The manner in which the exposure amounts may be determined is not limited to that where the formulas (10)are employed. Alternatively, the difference between or the ratio between the density balances of the reference films and the film to be subjected to printing may be directly calculated, and then be multiplied by the correction value Aj. Sill alternatively, calculations may be performed in such a manner that the COrreCtion value Aj acts upon the difference between or the ratio between the color balances of the reference film type and the film to be subjected to printing. The three color density balance of the reference film type and that of the film to be subjected to printing can be each determined from the gradients of each of the films with respect to three colors.

When the exposure control values Er, Eg and Eb have been calculated in this way, the exposure determining means 44 controls the motor 16 on the basis of these control values so as to control the printing exposure.

In the descriptions given above, the method in accordance with the first aspect of the present invention is applied to an automatic printer shown in FIG. 1. However, this is a mere example, and the method is applicable to various other apparatuses and structures. For instance, the method may be applied to a printer employing a white light subtractive process, such as that described below, or other color image producing equipment such as a scanning-type color copying machine.

Figure 12:
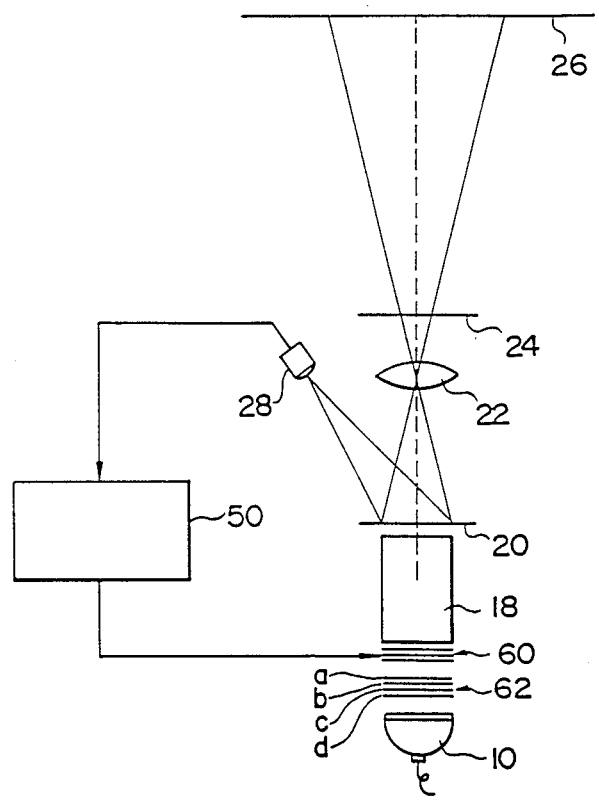

Next, descriptions will be given concerning the application of the method in accordance with the first aspect of the present invention to an automatic color photographic printer employing a white light subtractive color process. In FIG. 12. the same reference numerals as those in FIG. 1 denote the corresponding component parts, and the description of those component parts will be omitted.

Figure 13:
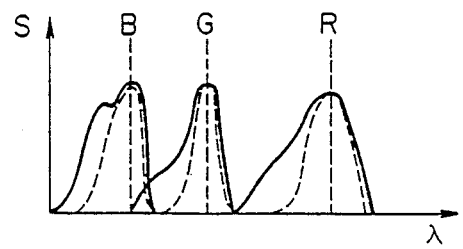
Figure 13:
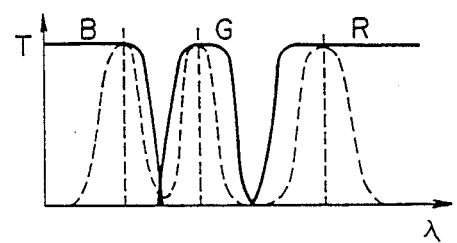
Figure 13:
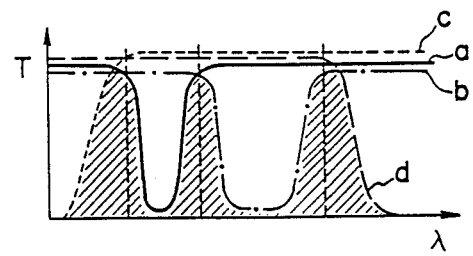
Figure 14:
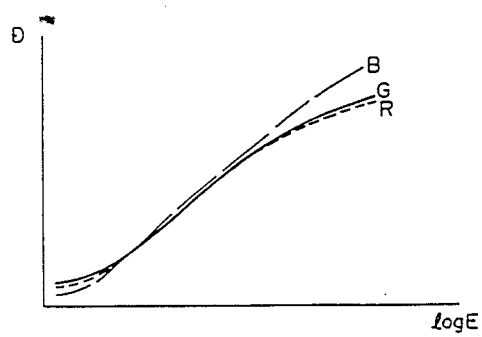

The printer includes an exposure determining section 50 which is the same as the corresponding part shown in FIG. 1 In the automatic color photographic printer employing a white light subtractive color process, light adjusting filters 60 and color-light regulating filters 62 are disposed in this order between the lamp house 10 and the mirror box 18. As is already known, the light adjusting filter 60 comprise three filters, namely a yellow (Y) filter, a magenta (M) filter, and a cyan (C) filter. When these filters 60 are controlled by the exposure determining section 50, the exposure amounts are controlled. The color-light regulating filters 62 are made up of four filters, namely, a BG regulating filter 62a for regulating B long wavelength light and G short-wavelength light, a GR regulating filter 62b for regulating G long-wavelength light and R short-wavelength light, an ultraviolet cutting filter 62c, and an infrared cutting filter 62d. With these color-light regulating filters 62, the combination of the ultraviolet cutting filter 62c and the BG regulating filter 62a forms B light, the combination of the BG regulating filter 62a and the GR regulating filter 62b forms G light, and the combination of the infrared cutting filter 62d and the GR regulating filter 62b forms R light. The transmittance characteristics of the color-light regulating filters 62 are shown in FIG. 13 (3).

The two dimensional image sensor 28 has the following filters. Namely, the sensor 28 has a B filter having a transmittance long-wavelength edge in the absorption band of the BG regulating filter 62a, a G filter having a transmittance short-wavelength edge in the absorption band of the BG regulating filter 62a and also having a transmittance long-wavelength edge in the absorption band of the GR regulating filter 62b, and a R filter having a transmittance short-wavelength edge in the absorption band of the GR regulation filter 62b. The transmittance characteristics of these R, G and B filters are indicated by solid lines in FIG. 13 (2). The combination of these filters of the sensor 28 with the color-light regulating filters 62 results in the transmittance distribution indicated by broken lines in FIG. 13 (2). The R, G and B filters are used with three colors arranged in a mosaic, striped, or checkered pattern, as disclosed in Japanese Patent Application No. 61-22155 (1986). With correction by the color light regulation filters 62, the spectral sensitivity of color paper is distributed as indicated by broken lines in FIG. 13 (1), in contrast with the spectral sensitivity of the same distributed as indicated by solid lines in FIG. 13 (1) before the correction. Thus, the spectral sensitivity distribution in color paper substantially accords with that in the photometric system shown in FIG. 13 (2).

When the two spectral sensitivity distributions have been coincided, light is measured using the color-light regulating filters 62, the printing condition for a reference negative film type is corrected in a manner similar to that described before, and printing is effected using the Y, M and C filters. Thus, the apparatus employing a white light subtractive color process is also able to effect correct printing even with respect to various film types having different characteristics. The printer employing white light subtractive color process may have its photometric system and its exposure system disposed separately, and the method in accordance with the first aspect of the present invention is of course applicable to this case, too.

As has been described above, according to the first aspect of the present invention, since the printing condition for a reference film type is corrected in accordance with the film characteristics, this ensures that films of various different types are subjected to correct printing. With the printing condition for the reference film type being set, films of various different types, which may be underexposed or overexposed, can be printed with high quality Furthermore, since films of various different types are subjected to printing using as the reference the printing condition for a reference film type, even when any variation occurs in the characteristics or performance of, e. g., the negative developing machine, negative films, or the automatic color photographic printer, it suffices if the sole printing condition for the reference film type is controlled, thereby facilitating proper management. Furthermore, since automatic correction is effected to achieve conditions which are appropriate to each of different film types, it is possible to produce correct prints from various types of films.

The above-described color correction values Aj may be determined as functions of Dj, or a value of an Aj-to-image density table. Further, the density values which may be used as the previously set density values Daj and Dbj in the determination of Aj are not limited to RO, RN, GO, etc. Instead, Aj may be determined from functions of XO, XN and XU (X=R, G or B; "0", "N" and "U" representing the over density, the normal density, and under density, respectively), determined from a multiplicity of image data, or determined as suitable constants. Also, instead of determining Aj, the product of Aj×a slope control value or Aj·Pj×a slope control value may be determined.

The image density which may be used as the image density obtained from the photometric values is not limited to the average image density. Instead, average densities such as the average densitY of high-density image portions, the average density of intermediate-density image portions, and the average densitY of low-density image portion may be selectively used. Although in the above-described embodiment, the deviation of colors is expressed using dw, however, instead of dW, dG or another value indicative of the difference with respect to one color, or a ratio between colors may be used. With respect to Aj, another correction factor may be added to prepare a matrix. The functional formula which may be used to determine the exposure is not limited to that described in the foregoing embodiment. Pj may be determined from formulas different from those described above. For instance, (GO-GN) or GO, etc. may be used instead of dWO; or a different density value may be used instead of GN, etc.

In the description given above, an example is given in which compensation is effected with respect to three colors R, G and B. Alternatively, compensation may be effected in a different manner. That is, difference in color balance is detected, and correction is effected using Aj only with respect to one color having a difference greater than a predetermined value.

Figure 16:
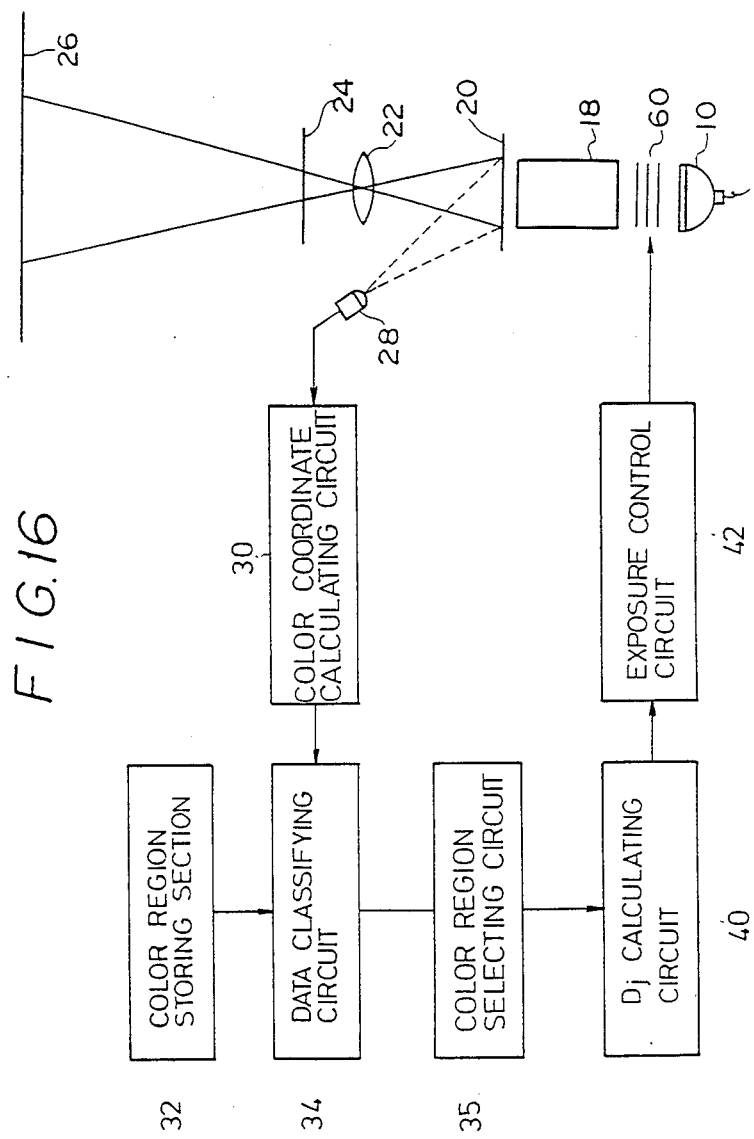
FIG. 16 is a schematic view showing an automatic printer used in a second embodiment of the present invention.

Next, a second embodiment of the present invention will be described with reference to the drawings concerned. The second embodiment relates to the second aspect of the present invention FIG. 16 schematically shows an automatic color photographic printer to which the method in accordance with the second aspect of the present invention may be applied. In FIG. 16, component parts corresponding to those shown in FIG. 1 or FIG. 12 are denoted by the same reference numerals, and descriptions of these component parts will be omitted.

The photometric apparatus 28 measures light with respect to each of a plurality of negative image portions Sn into which images on the color negative film 20 are divided, as shown in FIG. 17, the negative image portions being scanned along scanning lines SL. The measurement of light is effected by scanning each image portion with respect to the primaries R, G and B.

Figure 18:
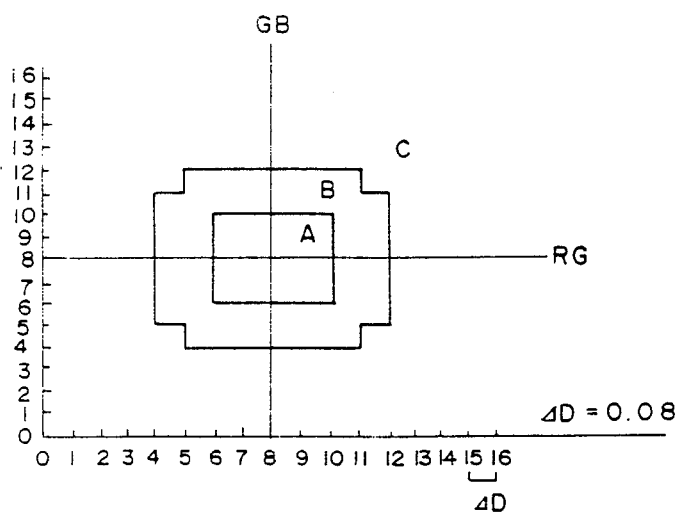
FIG. 18 is a graph showing examples of color regions.

The photometric apparatus 28 is connected to a color coordinate calculating circuit 30 for calculating the value R−G and the value G−B on the basis of photometric data obtained from the measurement of light with respect to each light measurement point. The color coordinate calculating circuit 30 is connected to a data classifying circuit 34 which is in turn connected to a color region storing section 32. The color region storing section 32 already stores therein three color regions. As shown in FIG. 18, these three color regions are set on a two-dimensional color coordinate system having an axis of abscissa RG (representing R−G) and an axis of ordinate GB (representing G−B), and comprise a neutral color region (region A), a low-saturation color region (region B), and a high-saturation color region (region C) The coordinate axes of the two-dimensional coordinate system are calibrated at intervals ΔD which are equal to, e.g., 0.08, and the color regions A, B and C are determined at positions corresponding to their respective distances from the origin. Thus, the origin of the coordinate system used in this embodiment is able to indicate a reference value.

The data classifying circuit 34 classifies items of the photometric data by determining to which color region each item of the photometric data obtained at each Point of light measurement belongs among all the color regions stored in the color region storing section 32. This determination is made by determining to which part, among various parts of the two-dimensional coordinate system, the points indicative of the values R−G and G−B calculated by the color coordinate calculating circuit 30 belong. In the following description, it is assumed that those items of photometric data included within the region A are expressed as CAij, those items of photometric data included within the region B are expressed as CBij, and those items of photometric data included within the region C are expressed as CCij. while the number of items of data included within the regions A, B and C are expressed as NA, NB and NC, respectively, i representing a number tentatively assigned to an item of photometric data within each region, and j representing one of colors B, G and R.

Referring to FIG. 16, the data classifying circuit 34 is connected to a color region selecting circuit 35. This color region selecting circuit 35 selects certain color regions to be used in the determination of the exposure, in accordance with the number of items of photometric data within each color region. A Dj calculating circuit 40, connected to the color region selecting circuit 35, calculates printer controlling values Dj on the basis of certain items of photometric data belonging to the color region selected by the color region selecting circuit 35.

The operation of the color region selecting circuit 35 and the Dj calculating circuit 40 will be described. In this embodiment, based on the fact that images formed by photography using a heterogeneous light source have no or only a very little neutral color (gray), the color region selecting circuit 35 and the Dj calculating circuit 40 perform the following procedures (1) to (3) so that proper color correction will be effected with respect to a heterogeneous light-source negative on the basis of the number of items of photometric data belonging to a color region having a small color difference from or color ratio to a reference value. In this embodiment, either the neutral color region A alone or both the region A and the low-saturation color reqion B serve as a specific color region.

(1) When NA≠0 (i.e, when an image portion has neutral colors), the color region selecting circuit 35 selects the region A, and the Dj calculating circuit 40 calculates the printer controlling values Dj on the basis of those photometric data belonging to the region A. That is, the Dj calculating circuit 40 calculates each printer controlling value Dj (corresponding to the term Dj in the above-mentioned formula (1)) on the basis of the photometric data CAij within the region A, using the following formula (11):

$$Dj = \frac{\Sigma CAij}{NA} \qquad (11)$$

Using the thus calculated value Dj, an exposure control circuit 42, provided between the Dj calculating circuit 40 and the light adjusting filters 60, calculates the printing exposure amount for each of B, G and R in accordance with the above-mentioned formula (1), and also controls the printing exposure by controlling the light adjusting filters 60 in such a manner that a filter corresponding to a color light whose quantity of light would otherwise be excessive is inserted into the optical path to bloc the color light.

By virtue of this procedure, it is possible to compensate for color failure caused by factors which include neither the use of a heterogeneous light source during photography of images on the relevant film nor changes in the film properties with the passage of time.

(2) When NA=0 and simultaneously NB≠0 (i.e, when an image portion has no neutral colors but has low-saturation colors), the color region selecting circuit 35 selects the region B, and the Dj calculating circuit 40 calculates the printer controlling values Dj on the basis of those photometric data CBij belonging to the region B, using the following formula (12):

$$Dj = \frac{\Sigma CBij}{NB} \qquad (12)$$

By virtue of this process where the printer controlling values Dj are calculated on the basis of the photometric data on colors having slightly higher levels of saturation than the neutral colors, it is possible to prevent the occurrence of color failure, and also to compensate for the influence of photography using, e.g., light which is a combination of daylight and light from a fluorescent lamp or weak light from a heterogeneous light source. With this procedure, although the effect of compensation for the color of the heterogeneous light source is weak, since the color of the heterogeneous light source is also weak, the risk of the colors of the resultant print being deteriorated is low.

(3) When NA=0, NB=0, and simultaneously NC≠0 (i.e, when an image portion has neither neutral colors nor low-saturation colors), the color region selecting circuit 35 selects the region C, and the Dj calculating circuit 40 calculates the printer controlling values Dj on the basis of those photometric data CCij belonging to the region C, using the following formula (13)

$$Dj = \frac{\Sigma CCij}{NC} \qquad (13)$$

In this case, since NA=NB=0, the photometric data belonging to the region C corresponding to high-saturation levels alone are used with the data remaining unchanged, in order to control the exposure amounts. In this case, therefore, the data used include only the data on the colors resulting from the use of a light-source during photography.

By virtue of this procedure, it is possible to effect compensation with respect to the case where photography took place using strong light from a heterogeneous light source.

Thus, when the image portion concerned is formed using, e.g., weak light from a heterogeneous light source, no data belongs to a neutral color region, whereas when it is formed using strong light from a heterogeneous light source, no data belongs to a neutral color region or a low saturation color region. In this embodiment, therefore, a color region is selected on the basis of the determination as to whether any of the photometric data belong to each of the regions set around a point indicative of a neutral color, and the exposure is determined on the basis of those photometric data belonging to the selected color region, thereby making it possible to determine an optimal exposure in accordance with the intensity of the light-source used during photography.

Next, a third embodiment of the present invention will be described with reference to FIGS. 18 and 20. The third embodiment also relates to the second aspect of the present invention. In contrast with the second embodiment in which the exposure is determined using those photometric data belonging to a selected color region alone, in the third embodiment, certain photometric data belonging to a region having a large color difference or color ratio (i.e., data belonging to a region which has not been selected) are also used in the determination of the exposure after these data have been converted into a representative of the data belonging to the region having the smallest difference from or ratio to a reference value, or into the reference value.

In FIG. 20, the same reference numerals as those shown in FIG. 16 are used to denote the same component parts, and descriptions of these parts are omitted. In the third embodiment, as shown in FIG. 20, the printer used also has a representative calculating circuit 36 and a representative setting circuit 38 which are provided in this order between the color region selecting circuit 35 and the Dj calculating circuit 40, the circuits 35 and 40 being the same as those shown in FIG. 16. In procedures (1) to (3), described below, a representative is calculated in accordance with the number of items of photometric data belonging to a color region (a specific color region), and those photometric data CCij belonging to the C region are converted into the representative, and then used to calculate the printer controlling values Dj. In the third embodiment, the region A and the region B serve as a specific color region.

(1) When $NA \neq 0$ and simultaneously $NB \neq 0$, the color region selecting circuit 35 selects the region A, and the representative calculating circuit 36 calculates a mean value $MDAj = (\Sigma CAij)/NA$ as the representative.

The representative setting circuit 38 sets each of CBij and CCij as the calculated MDAj (i.e., CBij=MDAj and CCij =MDAj), thereby setting and converting all the photometric data belonging to the region B or C as and into the mean value of the photometric data belonging to the region A. The Dj calculating circuit 40 Calculates the printer control values Dj using the following formula (14):

$$Dj = \frac{\Sigma CAij + \Sigma CBij + \Sigma CCij}{NA + NB + NC} \qquad (14)$$

Accordingly, the printer control values Dj are each expressed by the following formula (15):

$$Dj = \frac{\Sigma CAij + (NB + NC)MDAj}{NA + NB + NC} \qquad (15)$$

(2) When $NA = 0$ and simultaneously $NB \neq 0$, the color region selecting circuit 35 selects the region B, and the representative calculating circuit 36 calculates a mean value $MDBj = (\Sigma CBij)/NB$ as the representative.

The representative setting circuit 38 sets CCij as the calculated MDBj (i.e., CCij=MDBj), thereby setting and converting all the photometric data belonging to the region C as and into the mean value of the photometric data belonging to the region B. The Dj calculating circuit 40 calculates the printer control values Dj using the above-mentioned formula (14). Accordingly, the printer control values Dj are each expressed by the following formula (16):

$$Dj = \frac{\Sigma CBij + NC \cdot MDBj}{NB + NC} \qquad (16)$$

(3) When $NA = 0$ and simultaneously $NB = 0$, the color region selecting circuit 35 selects the region C, and the representative calculating circuit 36 calculates a mean value $MDCj = (\Sigma CCij)/NC$ as the representative. The representative setting circuit 38 sets CCij as the calculated MDCj (i e., CCij=MDCj), thereby setting and converting all the photometric data belonging to the region C as and into the mean value of the photometric data belonging to the region C. The Dj calculating circuit 40 calculates the printer control values Dj using the abovementioned formula (14). In this case, it would be easily understood that the setting Dj=MDCj is unnecessary, and the values Dj may be directly calculated as $Dj = (\Sigma CCij)/NC$.

Next, explanation will be given with reference to FIG. 19 concerning the case of compensating for green color failure, to give comparison between the method in which the photometric data belonging to the high-saturation color region are not used and the method in which such photometric data are used after their conversion into the reference value or a representative of the low-saturation color region, as in the third embodiment.

With a method in which the photometric data belonging to the high-saturation color region is not used, the printer control value Dj' is expressed as follows:

$$Dj' = (\Sigma CAij + \Sigma CBij)/(NA + NB) \qquad \ldots (17)$$

On the other hand, with a method in which the photometric data belonging to the high-saturation color region is converted into a representative of the lowsaturation color region, the printer control value is expressed as the above-stated formula (14). In this case, however, CCij=MDAj stands. Accordingly, the printer control value Dj is expressed by the above-stated formula (15).

Figure 19:
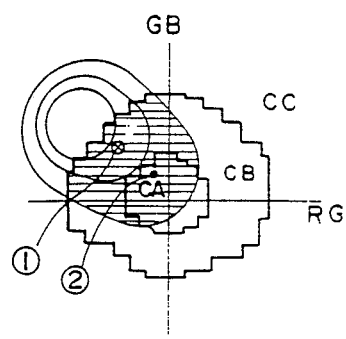
FIG. 19 is a graph used to explain compensation for green failure.

When the value of NC is so large as to satisfy the relationship $(NA+NB)/(NA+NB+NC) < 0.5$, since $|DR'-DG'| < |DR-DG|$ and simultaneously $|DG'-DB'| < |DG-DB|$, the point originally loCated at the position 1 shown in FIG. 19 is converted into a point located at the position 2. This makes it possible to effect compensation for color failure to a more appropriate extent than conventionally possible, without involving any degradation in the ability to cope with various different film types. Another advantage is that, even though the greater the number of items of photometric data belonging to the region C, the greater is the degree of color failure, the method carried out in this embodiment provides an increased ability to compensate for the color failure with an increase in the number of these items of data and, hence, in the degree of color failure.

When CCij=MDCj, the value expressed by the above-mentioned formula (14) is equal to the average density of a high-saturation image portion (i.e., the average of the data within the region C). When an image portion provides high-saturation data alone, the image includes colors resulting from the use of strong light from a heterogeneous light source. In this case, therefore, if the exposure is controlled in accordance with the image density of a high-saturation image portion, it is possible to effect proper compensation for the influence of strong light from a heterogeneous light source even with respect to various different film types.

As described above, according to the foregoing embodiment, the photometric data belonging to the region C is converted into a representative of the data belonging to the region A, thereby converting data on the high-saturation image portion into data on an entirely low saturation image, while the characteristics of the film concerned are taken into consideration. By virtue of this arrangement, it is possible to effect more stable and appropriate compensation for color failure than that possible with the prior art, without involving any degradation in the ability to cope with films of different film types. Furthermore, since the manner in which the photometric data is used is determined on the basis of the number of items of photometric data belonging to a specific color region and is thus varied, it is possible to effect stable printing without the risk that the compensation for the use of the heterogeneous light source may cause great deterioration in the print quality.

Figure 21:
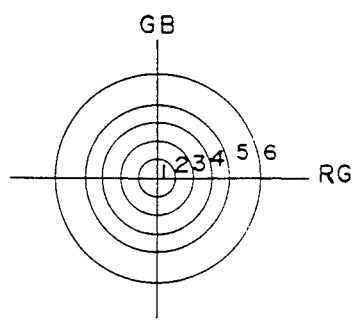
FIG. 21 is a graph showing other examples of color regions.

Next, a fourth embodiment of the present invention will be described. The fourth embodiment also relates to the second aspect of the present invention. In this embodiment, the printer used has the color region storing section 32 shown in FIG. 16 or 20, which stores therein six color regions 1, 2, 3, 4, 5 and 6 defined by concentric circles, as shown in FIG. 21. In the fourth embodiment, a low-saturation color region serves as the specific color region, and the color regions selected in accordance with the number of these items of data belonging to the specific color region are gradually shifted to the high-saturation side in such a manner that certain items of photometric data used in the determination of the exposure are gradually shifted to the high-saturation side. The embodiment adopts any one of the first to fourth methods described below under Items (1) to (4). In the following descriptions, N1 through N6 represent the numbers of items of data belonging to the regions 1 to 6, respectively.

(1) FIRST METHOD (a) When $N1 \neq 0$, the color region selecting circuit 35 selects the regions 1, 2 and 3, and the data belonging to the selected regions are used.

(b) When $N1=0$ and simultaneously $N2 \neq 0$, the color region selecting circuit 35 selects the regions 2, 3, and 4, and the data belonging to the selected regions are used.

(c) When $N1=N2=0$ and simultaneously $N3 \neq 0$, the color region selecting circuit 35 selects the regions 3, 4 and 5, and the data belonging to the selected regions are used.

(d) When $N1=N2=N3=0$ and simultaneously $N4 \neq 0$, the color region selecting circuit 35 selects the regions 4, 5 and 6, and the data belonging to the selected regions are used.

The exposure is determined by using the data belonging to the regions selected in one of the above-described procedures (a) to (d). In each of the above-described procedures, although three color regions are selected, it is not essential that the number of color regions to be used in the determination of the exposure be three.

(2) SECOND METHOD (a) When $N1 \neq 0$, the regions 1, 2 and 3 are selected by the color region selecting circuit 35, and the data belonging to the regions 4, 5, and 6 are each converted into a certain value (e.g., the reference value).

(b) When $N1=0$ and simultaneously $N2 \neq 0$, the regions 2, 3 and 4 are selected by the color region selecting circuit 35, and the data belonging to the regions 5 and 6 are each converted into a certain value (e.g., the reference value).

(c) When $N1=N2=0$ and simultaneously $N3 \neq 0$, the regions 3, 4 and 5 are selected by the color region selecting circuit 35, and the data belonging to the region 6 are each converted into a certain value (e.g., the reference value).

The exposure is determined on the basis of the data resulting from one of the procedures (a) to (c), i.e., the photometric data belonging to the selected regions and the converted data. Alternatively, the data belonging to the high-saturation region which is not among the selected color regions may be converted into a representative obtained from the data belonging to the low saturation region by the representative calculating circuit 36 and the representative setting circuit 38, as described before relating to the third embodiment.

(3) Third Method (a) When $N1 \neq 0$, the regions 1 through 6 are selected by the color region selecting circuit 35, and a weight (described later) is lowered from the region 1 toward the region 6 (i.e., as the color difference increases).

(b) When $N1=0$ and simultaneously $N2 \neq 0$, the regions 2 through 6 are selected by the color region selecting circuit 35, and the weight is lowered from the region 2 toward the region 6.

(c) When $N1=N2=0$ and simultaneously $N3 \neq 0$, the regions 3 through 6 are selected by the color region selecting circuit 35, and the weight is lowered from the region 3 toward the region 6.

(d) When $N1=N2=N3=0$ and simultaneously $N4 \neq 0$, the regions 4 through 6 are selected by the color region selecting circuit 35, and the weight is lowered from the region 4 toward the region 6.

The weight is so determined as to be, for instance. 1.0, 0.8, 0.4, and 0.0, in correspondence with the selected color regions, starting with the region of the lowest saturation among the selected regions. Naturally, the value of the weight may be varied in accordance with the procedures (a) to (d), specifically, in accordance with the number of items of photometric data belonging to the specific color region.

After the value of the weight in each of the color regions has been determined in the above-described manner, characteristic values with respect to three colors R, G and B in the color regions are obtained and are then weighted by the value of the weight, and the weighted mean value of the characteristic values is obtained. The exposure is determined on the basis of the thus obtained weighted mean value.

(4) FOURTH METHOD (a) When $N1 \neq 0$, the regions 1 through 3 are selected by the color region selecting circuit 35, and each of the items of data belonging to the regions 4, 5 and 6 is converted into a representative of the data belonging to the region 1.

(b) When $N1=0$ and simultaneously $N2 \neq 0$, the regions 2 through 4 are selected by the color region selecting circuit 35, and each of the items of data belonging to the regions 5 and 6 is converted into a representative of the data belonging to the region 2.

(c) When $N1=N2=0$ and simultaneously $N3 \neq 0$, the regions 3 through 4 are selected by the color region selecting circuit 35, and each of the items of data belonging to the region 6 is converted into a representative of the data belonging to the region 3.

The exposure is determined on the basis of the data resulting from one of the procedures (a) to (c), i.e., of the photometric data belonging to the selected regions and the converted data.

Figure 22:
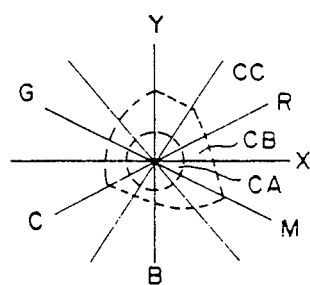
FIG. 22 is a graph used to explain coordinate axes of a color coordinate system.

Alternatively, the following arrangement may be adopted. Instead of dividing a two-dimensional or three-dimensional color coordinate system into regions, a range at a certain distance calculated by a predetermined method using as the reference either the measurement point closest to the point indicative of the reference value or a group of measurement points closest to the same is determined, and those photometric data within the range are used to determine the exposure. Still alternatively, the items of the photometric data may be plotted on the color coordinate system in a certain order in accordance with how small is the color difference from or color ratio to a reference value on the color coordinate system, and only a certain number of the items of the photometric data may be selected, starting with the item with the smallest color difference or color ratio (e.g., one half of all the items of photometric data are selected), the exposure being determined using the selected data. Still alternatively, the color regions may be determined using a polar coordinate system, such as that shown in FIG. 22, a three-dimensional coordinate system having density axes (indicative of, e.g., G, (B+G+R)/3), or values given below), or a two-dimensional coordinate system having coordinate axes which may be given by the following examples of combinations:

$$\begin{cases} X = R - G \\ Y = G \end{cases} \text{ and } \begin{cases} X = G - B \\ Y = G \end{cases}$$

$$\begin{cases} X = R/G \\ Y = (B + G + R)/3 \end{cases} \text{ and } \begin{cases} X = B/G \\ Y = (B + G + R)/3 \end{cases}$$

Figure 23:
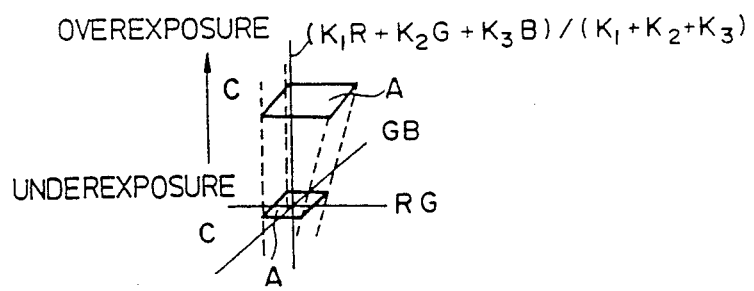
FIG. 23 is a graph showing a three-dimensional color coordinate system.

If the color region A is varied in accordance with the photographic image density in the manner illustrated in FIG. 23, this is preferable because it is possible to enhance the precision with which the printing exposure using an underexposed photographic image is controlled. In the above description of the fourth embodiment, although the color regions selected are changed in accordance with whether any item of photometric data belongs to a specific color region, the color regions selected may alternatively be changed by determining whether the number of these items of photometric data is above or below a predetermined value which is close to zero. Furthermore, although in the above-described embodiment, certain color region or regions in which the items of photometric data are converted into a certain value are not selected by the color region selecting circuit, a different arrangement may be adopted where these color regions are first selected by the color region selecting circuit, and the relevant items of data are each converted into a certain value. Sill further, although in the above-described embodiment, a region to which zero number of items of photometric data belong is not selected, the result would be the same if it were selected because the number of the relevant items of data is zero.

In the foregoing second to fourth embodiments, the method in accordance with the second aspect of the present invention is applied to a photographic printer. However, the method may be applied to other image copying equipment, such as a color copying machine or an electronic camera, in which the exposure is controlled on the basis of photometric values with respect to the primaries, with advantageous effects being provided.

Next, a fifth embodiment will be described with reference to FIG. 24. The fifth embodiment relates to the third aspect of the present invention. In FIG. 24, the same reference numerals as those shown in FIG. 12, 16 or 20 are used to denote the same component parts, and description of these component parts will be omitted.

The printer used has the representative calculating circuit 36 and the representative setting circuit 38 which perform the following procedures (1) to (3) wherein a representative is calculated in accordance with the number of items of photometric data belonging to each color region, each of those photometric data CCij belonging to the region C is set as and converted into the representative.

(1) When $NA \neq 0$ and simultaneously $NB \neq 0$, the representative calculating circuit 36 calculates either a mean value $MDAj = (\Sigma CAij)/NA$ or a mean value $MDABj = j (\Sigma CAij + \Sigma CBij)/(NA + NB)$ as the representative.

The representative setting circuit 38 sets the calculated mean value as the representative, and converts each of all the photometric data CCij belonging to the region C into either the mean value MDAj of the photometric data belonging to the region A (i.e., CCij=MDAj) or the mean value MDABj of the photometric data belonging to the regions A and B (i.e., CCij=MDABj).

(2) When $NA = 0$ and simultaneously $NB \neq 0$, the representative calculating circuit 36 calculates a mean value $MDBj = (\Sigma CBij)/NB$ as the representative. The representative setting circuit 38 sets the calculated mean value as the representative, and converts each of all the photometric data CCij belonging to the region C into the calculated mean value MDBj of the photometric data belonging to the region B (i.e., CCij=MDBj).

(3) When $NA = 0$ and simultaneously $NB = 0$, the representative calculating circuit 36 calculates a mean value $MDCj = (\Sigma CCij)/NC$ as the representative. The representative setting circuit 38 sets the calculated mean value as the representative, and converts each of all the photometric data CCij belonging to the region C into the calculated mean value MDCj (i.e., CCij=MDCj).

Subsequently, the Dj calculating circuit 40 calculates the printer control values Dj (corresponding to the term Dj in the above-mentioned formula (1)), using the following formula (18):

$$Dj = \frac{\Sigma CAij + \Sigma CBij + \Sigma TCCij}{NA + NB + NC} \tag{18}$$

(where CAij and CBij represent first image-data, while TCCij represents second image-data which are values resulting from the conversion of the data within the region C by the representative setting circuit 38)

Subsequently, exposure control amounts for B, G and R are calculated by the exposure control circuit 42 and in accordance with the formula (1), and the printing exposure is controlled by controlling the light adjusting filters 60 in such a manner that a filter corresponding to a color light whose quantity of light would otherwise be excessive is inserted into the optical path to block the color light.

Next, explanation will be given with reference to FIG. 19 concerning the case of compensating for green color failure, to give comparison between the fifth embodiment and a different method in which certain items of the photometric data which belong to the high-saturation color region are not used. In FIG. 19, there is shown a color coordinate system having coordinate axes indicative of R−G and G−B, on which the distribution of the items of photometric data is indicated by three concentric circular figures (hereinafter called "circles"), and on which color regions CA, CB and CC are set. When the photometric data obtained are concerned with negative film images having many portions resulting from the photography of green objects, a lot of items of the photometric data are distributed in a section of the color coordinate system in which both R−B<0 and G−B>0 stand. The figure indicates that the closer a circle is to the center of the concentric circles, the greater the number of items of photometric data distributed within the area defined by the circle. With the different method, since photometric data belonging to the high-saturation color region are excluded, the printer control value Dj′ is expressed as follows:

$$Dj' = (\Sigma CAij + \Sigma CBij)/(NA + NB) \quad \ldots (19)$$

On the other hand, according to the fifth embodiment, the printer control value is expressed as the above-stated formula (19). In this case, however, TCCij=MDAj stands. (Thus, the manner in which the printer control value is calculated in the fifth embodiment corresponds to that in the above-described third embodiment). The position of the value of Dj′ calculated from the formula (19) is indicated by the point 1 in FIG. 19, while the position of the value of Dj calculated from the formula (18) is indicated by the point 2. With the value positioned at 1, since the density with respect to G is relatively large, there is still the risk of color failure occurring.

When the value of NC is so large as to satisfy the relationship (NA+NB)/(NA+NB+NC)<0.5, since |DR′−DG′|<|DR−DG| and simultaneously |DG′−DB′|<|DG−DB|, the point originally located at the position 1 shown in FIG. 19 is converted into a point located at the position 2. This makes it possible to effect compensation for color failure to a more appropriate extent than conventionally possible, without involving any degradation in the ability to cope with various different film types. Furthermore, with the formula (19), the greater the deviation in color, the greater the value Dj′ because. In contrast, with the formula (18) employed in the fifth embodiment, the greater the deviation in color, the greater the ability provided to compensate for the color failure.

When TCCij=MDCj (this case corresponding to the above-described procedure (3)), the value expressed by the above-mentioned formula (18) is equal to the average density of a high-saturation image portion (i.e., the average of the data within the region C). When an image portion provides high-saturation data alone, the image includes colors resulting from the use of strong light from a heterogeneous light source. In this case, therefore, if the exposure is controlled in accordance with the image density of a high-saturation image portion, it is possible to effect proper compensation for the influence of strong light from a heterogeneous light source even with respect to various different film types.

As described above, according to the fifth embodiment, the mean value of the photometric data belonging to the region A or the regions A and B is set, and the photometric data belonging to the region C is suitably converted, thereby converting data on the high saturation image portion into data on an entirely low-saturation image, while the characteristics of the film concerned are taken into consideration. By virtue of this arrangement, it is possible to effect more stable and appropriate compensation for color failure than that possible with previous methods, without involving any degradation in the ability to cope with films of different film types.

Next, a sixth embodiment, also relating to the third aspect of the present invention, will be described. In this embodiment, the color region storing section 32 of the equipment used stores therein color regions, such as those shown in FIG. 25. Specifically, on a two-dimensional color coordinate system having the same coordinate axes as those described above, a color region corresponding to low levels of saturation is defined within a circle C1 whose center is at the origin of the coordinate system, while a color region corresponding to high levels of saturation is provided outside the low-saturation color region. The low-saturation color region is divided into concentric sub-regions A1 to A3, while the high-saturation color region is divided into radial sub regions A4 to A9. With these color regions, the exposure is determined in the following manner. In the following descriptions, items of photometric data belonging to the sub-regions A1 to A9 are represented by CA1ij, CA2ij, CA3ij, . . . CA9ij, respectively (generally represented by CA1ij), while the numbers of items of photometric data belonging to the respective sub-regions A1 to A9 are represented by NA1, NA2, ... NA9 (generally represented by NA1). The symbol "i" represents a number tentatively assigned to an item of photometric data within each region, and capable of assuming the value expressed as i=1 ∼ NA1 (within the sub-region A1), i=1 ∼NA2 (within the sub-region A2), i=1 ∼NA9 (within the sub-region A9), etc. The symbol "j" represents one of colors B, G and R.

First, the mean value of the photometric data CA1ij belonging to the sub-region A1 is calculated in the following manner $$\sum_{i=1}^{NA1} CA1ij/NA1 \quad (20)$$

and the photometric data belonging to the respective sub-regions A1 to A9 are each converted into the mean value (corresponding to the representative) expressed by the formula (20). The values resulting from this conversion are expressed as CB1ij. Subsequently, a weighted mean value Xj is calculated using the photometric data CA1ij (serving as the first image-data) and the converted values CB1ij (serving as the second image-data), in accordance with the following formula:

$$Xj = \frac{\sum_{1=1}^{9} \sum_{i=1}^{NA1} KA1 \cdot CA1ij + \sum_{1=1}^{9} \sum_{i=1}^{NA1} KB1 \cdot CB1ij}{\sum_{1=1}^{9} KA1 \cdot NA1 + \sum_{1=1}^{9} KB1 \cdot NA1} \quad (21)$$

where KA1 and KB1 are constants which are each set in such a manner as to vary as shown in the following Table 1 from the low-saturation side toward the high-saturation side (i.e., as I increases):

TABLE 1

| | KA1 | KB1 |
|---|---|---|
| 1 = 1 | 1.0 | 0.0 |

TABLE 1-continued

| | KA1 | KB1 |
|---|---|---|
| 1 = 2 | 0.9 | 0.1 |
| 1 = 3 | 0.4 | 0.6 |
| 1 = 4 to 9 | 0.0 | 1.0 |

In this way, as the level of saturation increases, the constant KA1 decreases, while the constant KB1 increases. By virtue of this arrangement, the higher the level of saturation, the greater becomes the influence of the converted values on the weighted mean value Xj, thereby making the proportion of data converted the greater, the higher the saturation level that the regions correspond to.

The thus obtained mean value Xj is used as the printer controlling value Dj. The exposure may alternatively be determined in a different manner in which the converted values CB1ij are divided into density components and chromatic components, a color correction value is calculated from the mean value Xj, and the printer controlling values Dj are corrected by the correction value, and then used in the exposure determination.

As described above, according to the present invention, the determination of the exposure is effected in the following manner: the mean value of the photometric data belonging to the color region corresponding to the lowest saturation level is used as the representative; a weighted mean value is calculated in such a manner that, with an increase in the saturation level to which the color regions correspond, the weight of the above-mentioned photometric data lowers while the weight of the representative value increases; and the mean value is used in the exposure determination.

Next, a seventh embodiment will be described. In this embodiment, the weighted mean value Xj, the same as that in the sixth embodiment, is calculated using the following formula. In the following description, CB1ij represents the converted values which are the same as those in the sixth embodiment:

$$Xj = \sum_{1=1}^{9} K1 \cdot MDA1j + \sum_{1=1}^{9} K1' \cdot MDB1j \quad (22)$$

(where $$MDA1j = \left( \sum_{i=1}^{NA1} CA1ij \right) / NA1$$

$$MDB1j = \left( \sum_{i=1}^{NA1} CB1ij \right) / NA1$$

and K1 is a coefficient including 0 and having at least one value other than 0, which decreases as 1 increases, while K1' is a coefficient including 0 and having at least one value other than 0, which increases as 1 increases)

Thus, one form of the third aspect of the present invention may be such that, as in this embodiment, the exposure is determined using characteristic values MDA1j obtained from the first image-data and MDB1j obtained from the second image-data.

Specifically, the exposure is determined in accordance with the formula Dj' = Dj + ΔXj where Dj is the value equal to Xj expressed by the above-stated formula (22), while color correction values ΔXj are calculated using Xj, and are expressed by, e.g., the following formulas:

$$\Delta XB = (XB - XG) + (\Sigma Xj'/3 - \Sigma Dj/3)$$

$$\Delta XG = (\Sigma Xj'/3 - \Sigma Dj/3)$$

$$\Delta XR = (XR - XG) + (\Sigma Xj'/3 - \Sigma Dj/3)$$

where $$Xj' = \left( \sum_{1=1}^{9} \sum_{i=1}^{NA1} CA1ij \right) / \sum_{1=1}^{9} NA1$$

In this case, however, the term Dj may be substituted by LATD or an average density of the entire or a part of the images.

Next, an eighth embodiment will be described. In this embodiment, six color regions 1, 2, 3, 4, 5 and 6 defined by concentric circles, as shown in FIG. 21, are used. In the eighth embodiment, items of photometric data to be used in the determination of the exposure are gradually shifted to the high-saturation side in accordance with the number of the items of data in each region. The embodiment adopts any one of the first to second methods described below under Items (1) and (2). In the following descriptions, N1 through N6 represent the numbers of items of data belonging to the regions 1 to 6, respectively.

(1) FIRST METHOD (a) When N1≠0, the data belonging to the regions 1, 2 and 3 are used.

(b) When N1=0 and simultaneously N2≠0, the data belonging to the regions 2, 3, and 4 are used.

(c) When N1=N2=0 and simultaneously N3≠0, the data belonging to the regions 3, 4 and 5 are used.

(d) When N1=N2=N3=0 and simultaneously N4≠0, the data belonging to the regions 4, 5 and 6 are used.

Subsequently, those data belonging to the high saturation region are each converted into a representative obtained from the data belonging to the low-saturation region, in a manner similar to that in the above-described embodiments, and this conversion is followed by the exposure determination.

(2) SECOND METHOD (a) When N1≠0, the data belonging to the regions 4, 5, and 6 are each converted into a representative of the data belonging to the region 1.

(b) When N1=0 and simultaneously N2≠0, the data belonging to the regions 5 and 6 are each converted into a representative of the data belonging to the region 2.

(c) When N1=N2=0 and simultaneously N3≠0, the data belonging to the region 6 are each converted into a representative of the data belonging to the region 3.

The exposure is determined on the basis of the data converted in one of the procedures (a) to (c).

Each of the foregoing fifth to eighth embodiments employs a representative of the photometric data belonging to a color region having a small color difference from a reference value or a small color ratio to a reference value. However, it is possible to carry out each of these embodiments employing the reference value instead of the representative, with similar effects being provided. When the use of a representative is compared with the use of the reference value, the use of a representative is advantageous in that it enables information on variations in characteristics between individual films to be indicated. However, the use of a representative leads to the lack of stability in some cases, and, in such cases, the use of the reference value is preferred.

A ninth embodiment will be described. In this embodiment, color regions A, B and C, such as those shown in FIG. 18 are used. The term Dj is calculated in the following manner:

When $(K-NA-NB)>0$.

$$Dj=\{\Sigma CAij+\Sigma CBij+(K-NA-NB)\cdot MDAj\}/K$$

When $(K-NA-NB)\leq 0$, $$Dj=(\Sigma CAij+\Sigma CBij)/(NA+NB)$$

(In the above-mentioned formulas, K represents a constant which is a value equal to, e.g., one third of the total number of the entire photometric data)

In this way, when the number of photometric data belonging to a region having a small color difference or color ratio to a reference value is below a predetermined value, the shortage of the number of those data is compensated for by the use of a representative of the data belonging to the color region whose color difference from or color ratio to a reference value is the smallest. By virtue of this arrangement, it is possible to prevent a reduction in the density due to the shortage of the number of the items of data within the regions A and B. As stated before, the reference value may be used instead of the representative.

In carrying out the foregoing embodiments relating to the third aspect of the present invention, the following arrangement may be adopted. Instead of dividing a two-dimensional or three-dimensional color coordinate system into regions, a range at a certain distance calculated by a predetermined method using as the reference either the measurement point closest to the point indicative of a neutral color value or a group of measurement points closest to the same is determined, and those photometric data within the range are used to determine the exposure. Still alternatively, the color regions may be determined using a polar coordinate system, such as that shown in FIG. 22, a three-dimensional coordinate system having density axes (indicative of, e.g., G, $(B+G+R)/3$), or values given below), or a two-dimensional coordinate system having coordinate axes which may be given by the following examples of combinations:

$$\begin{cases} X = R - G \\ Y = G \end{cases} \text{and} \begin{cases} X = G - B \\ Y = G \end{cases}$$

$$\begin{cases} X = R/G \\ Y = (B + G + R)/3 \end{cases} \text{and} \begin{cases} X = B/G \\ Y = (B + G + R)/3 \end{cases}$$

The above-described coefficients KA, KB, K and K' may be varied in accordance with the properties of the images (e.g., the use of artificial light, or the light-source color temperature), or factors related to the image densitY (e.g., underexposure, or overexposure). In order to perform this variation, various values for the coefficients may be prepared for use in each of various cases, or a function may be used to calculate various values for the coefficients. If the color region A is varied in accordance with the photographic image density in the manner illustrated in FIG. 23, this is preferable because it is possible to enhance the precision with which the printing exposure using an underexposed photographic image is controlled.

In the foregoing fifth to ninth embodiments, the method in accordance with the third aspect of the present invention is applied to a photographic printer. However, the method may be applied to other image copying equipment, such as a color copying machine or an electronic camera, in which the exposure is controlled on the basis of photometric values with respect to the primaries, with advantageous effects being provided.

What is claimed is:

1. An exposure determining method comprising the steps of:
    (a) obtaining photometric data by measuring light of a film to be subjected to printing, said measuring being effected on a plurality of portions into which at least a part of said film is divided;
    (b) determining a color correction value for a printing exposure condition for a reference film type with respect to at least one color, said at least one color being selected on the basis of a difference in a three color density balance of said film to be subjected to printing from said three color balance of said reference film type;
    (c) correcting said printing exposure condition by applying said color correction value in either a high-density area or a low-density area of said film; and
    (d) determining an exposure on the basis of said corrected printing exposure condition and also on the basis of image density values for three colors which are calculated on the basis of said photometric data belonging to a specific color region of the film images to be printed.

2. An exposure determining method according to claim 1, wherein, said color correction value is determined by a calculation using a formula dependent upon previously set image density values and the image density value of at least one color which is among said image density values calculated on the basis of said photometric data belonging to said specific color region.

3. An exposure determining method according to claim 2, wherein said color correction value increases from an intermediate-density area of said film to be subjected to printing toward either a high-density area or a low-density area of said film.

4. An exposure determining method according to claim 2, wherein said color correction value is calculated using the following formula:

$$Aj = k1j (Dj - Daj)/(Dbj - Daj) + k2j$$

(where Aj represents said color correction value, j represents one color selected from a group consisting of red color, green color and blue color; Dj represents an image density value for the color j calculated on the basis of said photometric data belonging to said specific color region; Daj and Dbj represent previously set density values with respect to the color j of which respective magnitudes are in a mutual relationship of Dbj>Daj; and k1j and k2j are coefficients for the color j for determining a magnitude of said color correction value Aj and which coefficients each include zero in its range but both cannot simultaneously equal zero).

5. An exposure determining method according to claim 1, wherein, in the step (c) of determining the exposure, said image density values for three colors, or values corresponding to said image density values, are multiplied by the reciprocals of gradients with respect to three colors in a specific density area of the reference film type.

6. An exposure determining method according to claim 1, wherein each of, the three color density balance of said film to be subjected to printing, and the three color density balance of the reference film type, is determined respectively from gradients of three colors of said film and gradients of three colors of the reference film type.

7. An exposure determining method comprising the steps of:
(a) effecting measurement of light with respect to red (R) light, green (G) light and blue (B) light and with respect to a pluralitY of portions into which an original image is divided, thereby obtaining items of photometric data on three colors;
(b) classifying said items of photometric data on three colors by determining to which color region said items of photometric data on three colors belong among a plurality of color regions into which at least one previously set color coordinate system is divided;
(c) selecting a color region or color regions in accordance with the number of items of the photometric data which belong to a specific color region;
(d) obtaining characteristic values with respect to the primaries using at least said photometric data belonging to said selected color region or regions; and
(e) determining an exposure on the basis of the characteristic values obtained.

8. An exposure determining method according to claim 7, wherein, in the step (d), a weight is determined with respect to each of the selected color regions, said weight being either a weight varying in accordance with a magnitude of a color difference or of a color ratio, or a weight varying in accordance with the number of items of said photometric data belonging to said specific color region, and characteristic values are obtained on the basis of said photometric data, and with respect to each of the selected color regions; and, in the step (e), said characteristic values are each weighted by using said weight so as to obtain a weighted mean value, the exposure being determined on the basis of the thus obtained weighted mean value.

9. An exposure determining method according to claim 7, wherein said specific color region is either a color region whose color difference from a reference value is small or a color region whose color ratio to a reference value is small.

10. An exposure determining method according to claim 7, wherein, when the number of items of said photometric data belonging to said specific color region is above a predetermined value including zero, the photometric data belonging to either a color region whose color difference from a reference value is large or a color region whose color ratio to a reference value is large is not used in the determination of exposure, or is used in the determination of exposure after having been converted into a certain value.

11. An exposure determining method according to claim 7, wherein, when the number of items of said photometric data belonging to said specific color region is below a predetermined value including zero, the photometric data belonging to either a color region whose color difference from a reference value is large or a color region whose color ratio to a reference value is large is used in the determination of exposure.

12. An exposure determining method according to claim 10, wherein said certain value is one value selected from a group consisting of the reference value, a representative of photometric data belonging to a color region whose color difference from a reference value is small, and a representative of photometric data belonging to a color region whose color ratio to a reference value is small.

13. An exposure determining method comprising the steps of:
(a) effecting measurement of light with respect to red (R) light, green (G) light and blue (B) light and with respect to a plurality of portions into which a color photographic image is divided, thereby obtaining items of photometric data on three colors;
(b) classifying said items of photometric data on three colors by determining to which color regions said items of photometric data on three colors belong among a plurality of color regions into which at least one previously set color coordinate system is divided;
(c) defining, as first image-data, the photometric data belonging to either a color region whose color difference from a reference value is small or a color region whose color ratio to a reference value is small, and also defining, as second image data, a representative of said first image-data or the reference value; and
(d) determining an exposure on the basis of characteristic values with respect to the primaries which are obtained from said first image-data and said second image-data.

14. An exposure determining method according to claim 13, wherein, in determining the exposure, at least part of the items of photometric data which belong to either a color region whose color difference from the reference value is large or a color region whose color ratio to the reference value is large is converted into second image-data, the exposure being determined on the basis of characteristic values obtained from said first image-data and said second image-data.

15. An exposure determining method according to claim 13, wherein said characteristic values with respect to the primaries are each a weighted mean value of a characteristic value obtained from said first image data and a characteristic value obtained from said second image data.

16. An exposure determining method comprising the steps of:
(a) effecting measurement of light with respect to red (R) light, green (G) light and blue (B) light and with respect to a plurality of portions into which a color photographic image is divided, thereby obtaining items of photometric data on three colors;
(b) classifying said items of photometric data on three colors by determining to which color regions said items of photometric data on three colors belong among a plurality of color regions into which at least one previously set color coordinate system is divided;
(c) determining an exposure on the basis of characteristic values with respect to the primaries which are obtained from photometric data belonging to either a color region whose color difference from a reference value is small or a color region whose color ratio to a reference value is small, and also on the basis of one value selected from a group consisting of the reference value and a representative of photometric data belonging to either a color region whose color difference from a reference value is small or a color region whose color ratio to a reference value is small.

17. An exposure determining method according to claim 13, wherein said plurality of color regions into which said color coordinate system is divided comprise at least two color regions determined on the basis of a distance on the color coordinate system from a point indicative of either a value concerning a specific color of said photographic image or a reference value calculated from a plurality of images.

18. An exposure determining method according to claim 16, wherein said plurality of color regions into which said color coordinate system is divided comprise at least two color regions determined on the basis of a distance on the color coordinate system from a point indicative of either a value concerning a specific color of said photographic image or a reference value calculated from a plurality of images.

19. An exposure determining method according to claim 17, wherein said specific color is one color selected from a group consisting of a neutral color, a flesh color, and a color determined from an average concerning said plurality of images.

20. An exposure determining method according to claim 18, wherein said specific color is one color selected from a group consisting of a neutral color, a flesh color, and a color determined from an average concerning said plurality of images.

21. An exposure determining method according to claim 13, wherein said representative is the mean value of photometric data belonging to a certain color region to which at least photometric data on the color photographic image belongs and whose color difference from the reference value or color ratio to the reference value is the smallest.

22. An exposure determining method according to claim 16, wherein said representative value is the mean value of those photometric data belonging to a certain color region to which at least photometric data on the color photographic image belongs and whose color difference from the reference value or color ratio to the reference value is the smallest.

* * * * *